US012148372B2

(12) United States Patent
Zhang et al.

(10) Patent No.: US 12,148,372 B2
(45) Date of Patent: Nov. 19, 2024

(54) DRIVING CIRCUIT, DRIVING METHOD, AND DISPLAY PANEL

(71) Applicants: Wuhan Tianma Micro-Electronics Co., Ltd., Wuhan (CN); Wuhan Tianma MicroElectronics Co., Ltd. Shanghai Branch, Shanghai (CN)

(72) Inventors: Mengmeng Zhang, Shanghai (CN); Yue Li, Shanghai (CN); Yuantao Wu, Shanghai (CN); Jing Huang, Shanghai (CN)

(73) Assignees: Wuhan Tianma Micro-Electronics Co., Ltd., Wuhan (CN); Wuhan Tianma MicroElectronics Co., Ltd. Shanghai Branch, Shanghai (CN)

( * ) Notice: Subject to any disclaimer, the term of this patent is extended or adjusted under 35 U.S.C. 154(b) by 91 days.

(21) Appl. No.: 17/707,470

(22) Filed: Mar. 29, 2022

(65) Prior Publication Data

US 2023/0215353 A1 Jul. 6, 2023

(30) Foreign Application Priority Data

Dec. 31, 2021 (CN) ......................... 202111664318.6

(51) Int. Cl.
*G09G 3/3233* (2016.01)

(52) U.S. Cl.
CPC ... *G09G 3/3233* (2013.01); *G09G 2300/0842* (2013.01); *G09G 2310/0297* (2013.01);
(Continued)

(58) Field of Classification Search
CPC ......... G09G 3/3233; G09G 2300/0842; G09G 2310/0297; G09G 2310/061;
(Continued)

(56) References Cited

U.S. PATENT DOCUMENTS

2015/0061983 A1* 3/2015 Kim ..................... G09G 3/3275 345/82
2017/0124941 A1* 5/2017 Na ....................... G09G 3/2092
(Continued)

FOREIGN PATENT DOCUMENTS

CN 107863067 A 3/2018
CN 108470537 A 8/2018
(Continued)

*Primary Examiner* — Jeff Piziali
(74) *Attorney, Agent, or Firm* — Anova Law Group, PLLC

(57) ABSTRACT

A driving circuit and a display panel are provided. The driving circuit includes a pixel circuit and a demultiplexing circuit. The pixel circuit includes a driving transistor, a light-emitting device, and a data writing module. The driving transistor is connected between a first power signal terminal and the light-emitting device in series, to generate a driving current. The data writing module is connected between the driving transistor and the demultiplexing circuit in series, to provide a data signal to the driving transistor. An output terminal of the demultiplexing circuit is connected to an input terminal of the data writing module through a data line. The demultiplexing circuit is configured to write the data signal to the data line when the driving transistor is performing threshold compensation.

18 Claims, 25 Drawing Sheets

(52) U.S. Cl.
CPC ................. *G09G 2310/061* (2013.01); *G09G 2320/0626* (2013.01)

(58) Field of Classification Search
CPC ... G09G 2320/0626; G09G 2300/0814; G09G 2300/0819; G09G 2320/045; G09G 3/3208
See application file for complete search history.

(56) References Cited

U.S. PATENT DOCUMENTS

| | | | | |
|---|---|---|---|---|
| 2017/0140706 | A1* | 5/2017 | Song | G09G 3/3233 |
| 2017/0141177 | A1* | 5/2017 | Kim | G09G 3/3258 |
| 2017/0309230 | A1* | 10/2017 | Kwon | G09G 3/3275 |
| 2018/0190197 | A1* | 7/2018 | Chang | G09G 3/3233 |
| 2020/0111418 | A1* | 4/2020 | Nam | G09G 3/3233 |
| 2020/0243021 | A1* | 7/2020 | Li | G09G 3/3266 |
| 2021/0036088 | A1* | 2/2021 | Jo | H10K 59/131 |
| 2022/0101793 | A1* | 3/2022 | Yu | G09G 3/3233 |
| 2022/0310017 | A1* | 9/2022 | Yang | G09G 3/3241 |
| 2023/0040529 | A1* | 2/2023 | Kang | H10K 59/131 |
| 2023/0419897 | A1* | 12/2023 | Zhang | G09G 3/3233 |

FOREIGN PATENT DOCUMENTS

| | | | |
|---|---|---|---|
| CN | 109903724 | A | 6/2019 |
| CN | 111341257 | A | 6/2020 |
| CN | 111445854 | A | 7/2020 |
| CN | 111508422 | A | 8/2020 |

* cited by examiner

DRIVING CIRCUIT, DRIVING METHOD, AND DISPLAY PANEL

CROSS-REFERENCE TO RELATED APPLICATION

This application claims the priority of Chinese Patent Application No. 202111664318.6, filed on Dec. 31, 2021, the content of which is incorporated herein by reference in its entirety.

TECHNICAL FIELD

The present disclosure generally relates to the field of display technology and, more particularly, relates to a driving circuit, a driving method, and a display panel.

BACKGROUND

Organic light-emitting diode (OLED) display is one of hot topics in the field of current flat panel display research. Compared with liquid crystal display (LCD), OLED has the advantages of low energy consumption, low production cost, self-illumination, wide viewing angle and fast response speed. OLED has begun to replace traditional liquid crystal displays. The design of driving circuits is a key technology to realize a display function. A driving circuit generally includes a scanning driving circuit, a light-emitting control circuit, a data driving circuit, a pixel circuit, etc. The pixel circuit design is the core technical content of the OLED display and has important research significance.

With the development of display technology, people's requirements for display effects are getting higher and higher. However, the existing display panels are prone to problems of uneven display and poor display effects. Moreover, with the popularity of display devices, users not only have higher and higher requirements for the types of functions and performance of display devices but also have higher and higher requirements for the appearance of display devices. Conditions such as thinning and narrow frames of the display devices become important factors in how to select a display device. Since most of the driving circuits are generally arranged in the frame areas of the display devices, the driving circuit plays an important role among many factors affecting the frames of the display devices.

Therefore, it is imperative to provide a driving circuit, a driving method thereof, and a display panel, to improve the display effect and facilitate the realization of a narrow frame.

SUMMARY

One aspect of the present disclosure provides a driving circuit. The driving circuit includes a pixel circuit and a demultiplexing circuit. The pixel circuit includes a driving transistor, a light-emitting device, and a data writing module. The driving transistor is connected between a first power signal terminal and the light-emitting device in series, to generate a driving current. The data writing module is connected between the driving transistor and the demultiplexing circuit in series, to provide a data signal to the driving transistor. An output terminal of the demultiplexing circuit is connected to an input terminal of the data writing module through a data line. The demultiplexing circuit is configured to write the data signal to the data line when the driving transistor is performing threshold compensation.

Another aspect of the present disclosure provides a driving method of a driving circuit. The driving circuit includes a pixel circuit and a demultiplexing circuit. The pixel circuit includes a driving transistor, a light-emitting device, and a data writing module. The driving transistor is connected between a first power signal terminal and the light-emitting device in series, to generate a driving current. The data writing module is connected between the driving transistor and the demultiplexing circuit in series, to provide a data signal to the driving transistor. An output terminal of the demultiplexing circuit is connected to an input terminal of the data writing module through a data line. The demultiplexing circuit is configured to write the data signal to the data line when the driving transistor is performing threshold compensation. The driving method includes at least a threshold voltage compensation stage and a data signal charging stage. In the threshold voltage compensation stage, the driving transistor performs threshold compensation. In the data signal charging stage, the demultiplexing circuit charges data signal into the data line. The operating time of the threshold voltage compensation stage and the operating time of the data signal charging stage at least partially overlap.

Another aspect of the present disclosure provides a display panel. The display panel includes a driving circuit. The driving circuit includes a pixel circuit and a demultiplexing circuit. The pixel circuit includes a driving transistor, a light-emitting device, and a data writing module. The driving transistor is connected between a first power signal terminal and the light-emitting device in series, to generate a driving current. The data writing module is connected between the driving transistor and the demultiplexing circuit in series, to provide a data signal to the driving transistor. An output terminal of the demultiplexing circuit is connected to an input terminal of the data writing module through a data line. The demultiplexing circuit is configured to write the data signal to the data line when the driving transistor is performing threshold compensation.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
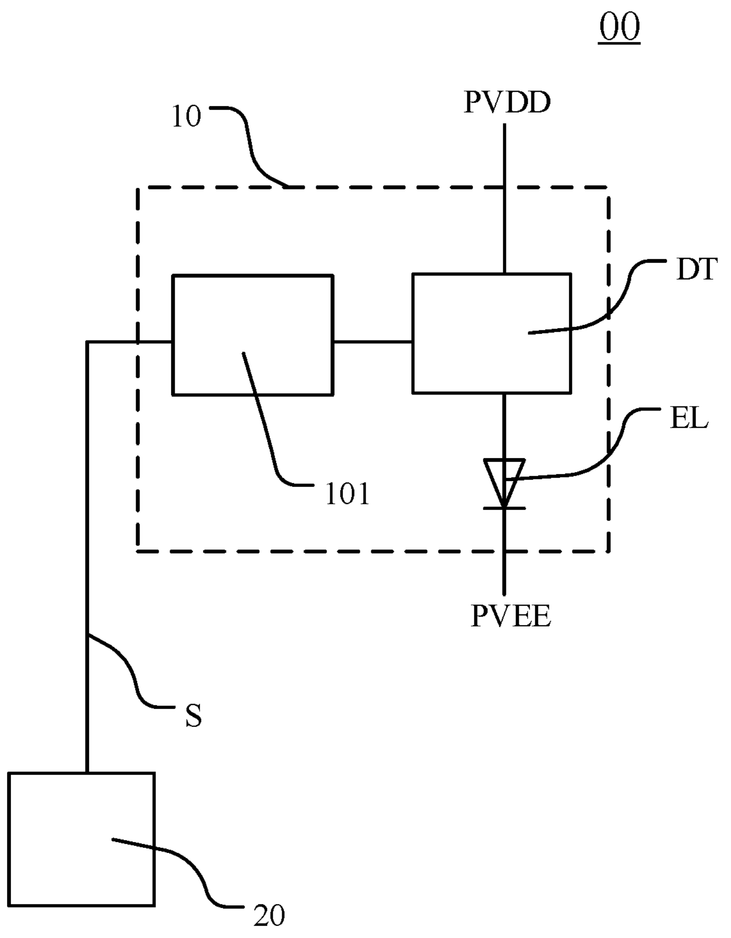
FIG. 1 illustrates an exemplary frame connection structure of a driving circuit consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only configured to distinguish one entity or operation from another entity or operation, and do not necessarily require or imply any such actual relationship between these entities or operations or order. Moreover, the terms “including”, “comprising” or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence “including . . . ” do not exclude the existence of other same elements in the process, method, article, or equipment that includes the elements.

It should be understood that when describing the structure of a component, when a layer or area is referred to as being “on” or “above” another layer or another area, the layer or area may be directly on the other layer or area, or indirectly on the other layer or area, for example, layers/components between the layer or area and another layer or another area. And, for example, when the component is reversed, the layer or area may be “below” or “under” the other layer or area.

In the present disclosure, the term “electrical connection” refers to that two components are directly electrically connected with each other, or the two components are electrically connected via one or more other components.

A display panel usually includes a plurality of pixel circuits, and each pixel circuit usually includes a driving transistor and a light-emitting device. The driving transistor generates a driving current to control the light-emitting brightness of the light-emitting device. The display panel usually further includes a data drive circuit. The data drive circuit generally decomposes a signal into a plurality of signal channels by setting a demultiplexer (demux) to reduce an area of a non-display area occupied by data lines. For example, demux 1:3, which decomposes a signal into 3 signal channels, is usually adopted, to achieve a certain degree of the narrow frame. To realize a narrower frame, the multiplexer may be set to demux 1:6 (decomposing a signal into 6 signal channels), demux 1:12 (decomposing a signal into 12 signal channels), or other structures. The pixels per inch (PPI) is the unit of pixel density, indicating the number of pixels per inch. When the PPI value is higher, the display panel may be capable of displaying images with a higher density. When PPI of a display product is higher, the number of clock signal lines is larger when using a plurality of demultiplexers to design structure, and the time occupied by the clock control signals in the scanning time of a row of pixels is larger. Limited by the fixed scanning time of a row of pixels, the scanning time provided by the corresponding pixel circuit is severely compressed. Therefore, when displaying images, the display panel is prone to the problem including uneven display. The display quality is reduced, and the display effect cannot be guaranteed. Therefore, it is difficult to make the pixel circuit have sufficient scanning time, to realize a narrower frame through the demultiplexer structure design while ensuring the display effect.

The present disclosure provides a driving circuit and its driving method, and a display panel, to realize a narrower frame while ensuring the display effect.

The present disclosure provides a driving circuit. As shown in FIG. 1, in one embodiment, the driving circuit 00 may at least include a pixel circuit 10 and a demultiplexing circuit 20.

The pixel circuit 10 may at least include a driving transistor DT, a light-emitting device EL, and a data writing module 101.

The driving transistor DT may be connected in series between a first power signal terminal PVDD and the light-emitting device EL to generate a driving current.

The data writing module 101 may be connected in series between the driving transistor DT and the demultiplexing circuit 20 for providing data signals to the driving transistor DT.

An output terminal of the demultiplexing circuit 20 may be connected to an input terminal of the data writing module 101 through a data line S, and the demultiplexing circuit 20 may be configured to write the data signal into the data line S while the driving transistor DT performs threshold compensation.

The driving circuit 00 may be used in a display panel to provide a driving signal for the display panel to achieve a display function. The driving circuit 00 may include at least the pixel circuit 10 and the demultiplexing circuit 20. Optionally, when the driving circuit 00 is arranged in the display panel, one pixel circuit 10 may correspond to one sub-pixel of the display panel, and a plurality of sub-pixels may cooperate to realize the image display in the display panel. The demultiplexing circuit 20 may be used as a data driving circuit for providing data signals for the data line S in the display panel.

In the driving circuit 00, the pixel circuit 10 may at least include the driving transistor DT, the light-emitting device EL, and the data writing module 101. The driving transistor DT may be connected in series between the first power supply signal terminal PVDD and the light-emitting device EL, and the first power supply signal terminal PVDD may receive a first voltage signal provided by a driving integrated circuit (IC). Optionally, the first voltage signal may be a high voltage signal. The driving transistor DT may be configured for providing a driving current to the light-emitting device EL in the light-emitting stage, at least under the enabling effect of the first voltage signal. The light-emitting device EL may be configured for emitting light in response to the driving current in the light-emitting stage.

The output terminal of the demultiplexing circuit 20 may be connected to the input terminal of the data writing module 101 through the data line S. That is, when the driving circuit 00 is applied in the display panel, the display panel may usually include a plurality of data lines S. One terminal of one data line S of the plurality of data lines S may be connected to the output terminal of the demultiplexing circuit 20, and another terminal of the data line S may be connected to the input terminal of the data writing module 101. After the demultiplexing circuit 20 writes the data signal provided by the driver chip (IC) into the data line S, the data signal may be transmitted to the data writing module 101 through the data line S. Since the data writing module 101 is connected in series between the driving transistor DT and the demultiplexing circuit 20, the data signal received by the data writing module 101 may be provided to the driving transistor DT, such that the demultiplexing circuit 20 and the pixel circuit 10 can pass the data signal received by the data writing module 101 to realizes light emission of the light-emitting device EL.

The demultiplexing circuit 20 may be configured to write the data signal into the data line S while the driving transistor DT performs threshold compensation. That is, while the driving transistor DT of the pixel circuit 10 performs threshold compensation, the demultiplexing circuit 20 may write the data signal into the data line S. Because of the currently process conditions, the threshold voltage of the driving transistor DT is generally unstable. Because of the threshold voltage drift, it is easy to cause the light-emitting brightness of the light-emitting device EL to change. To avoid this situation, the driving transistor DT needs to perform threshold value compensation.

In existing technologies, the threshold compensation of the driving transistor is achieved by: writing the data signal into the first electrode of the driving transistor through the data writing module, and then controlling the control electrode of the driving transistor to rise, such that the potential difference between the first electrode and the control electrode of the driving transistor is the threshold voltage of the drive transistor to finish threshold compensation of the drive transistor. When the driving circuit is applied to the display panel to drive the display panel to operate, the scanning time of a row of pixels is the time required to finish the scan of a row of sub-pixels in a time of a frame. Since the threshold compensation of the driving transistor requires the participation of the data signal, in a fixed scanning time of a row of pixels, threshold compensation needs to be performed after the demultiplexing circuit completes the writing of data signal into the data line. The scanning time of threshold compensation is shortened, resulting in insufficient threshold compensation and display problems. Further, when the display panel needs to realize a narrow frame design, the demultiplexing circuit 20 in the driving circuit 00 adopts a design structure including a plurality of demultiplexers, and the number of clock signal lines is large. Correspondingly, the time occupied by the clock control signal in the scanning time of a row of pixels is larger and the time to complete the writing of the data signal into the data line S increases, resulting in a severe shortening of the scanning time for threshold compensation.

In one example, the fixed scanning time of a row of pixels is 35 μs, the demultiplexing circuit 20 adopts the structure of demux 1:12 (decomposing a signal into 12 signal channels), the number of clock signal lines CKH is 12, and the pulse width occupied by each of the clock signal line CKH is 2 μs, the total pulse width occupied by the 12 clock signal lines CKH is 24 μs, and the gap pulse width is 0.5p. Therefore, the total gap pulse width occupied by the 12 clock signal lines CKH in the scanning time of a row of pixels is 6 μs. After the demultiplexing circuit 20 completes the writing of the data signal into the data line S, the gap pulse width of the scanning time for threshold compensation is removed by 1 μs, and the remaining time is only 4 μs. That is, the scanning time of the final threshold compensation is shortened to 4 μs. The threshold compensation of the driving transistor is insufficient, resulting in a serious mura phenomenon during display (that is, the phenomenon of various traces caused by uneven brightness of the display panel).

In the present disclosure, when the demultiplexing circuit 20 writes the data signal to the data line S, the driving transistor DT of the pixel circuit 10 may perform the threshold compensation. The time for threshold compensation may be increased, such that the driving transistor DT may be sufficiently compensated. Therefore, when the driving circuit 00 is applied to a display panel, the phenomenon of uneven display may be avoided, to improve the uniformity of display brightness and the display effect. Further, since the threshold compensation of the driving transistor DT and the writing of the data signal to the data line by the demultiplexing circuit 20 do not need to be performed in sequence, the demultiplexing circuit 20 may adopt a structure with as many clock signal lines as possible. When the driving circuit 00 of this embodiment is applied to the display panel, it may be beneficial to realize a narrow frame of the display panel while ensuring the display effect.

In one embodiment, the control electrode may be a gate of the driving transistor DT, and the first electrode may be a source or a drain of the driving transistor DT. The present disclosure has no limit on this.

In one embodiment, the light-emitting device EL may be a light-emitting device driven by a current, including a light-emitting diode, or an organic light-emitting diode. The embodiment where the light-emitting device is an OLED will be used as an example to illustrate the present disclosure.

The embodiment where the pixel circuit 10 includes the structure shown in FIG. 1 is used as an example to illustrate the present disclosure, and does not limit the scope of the present disclosure. In some other embodiments, the frame structure of the pixel circuit 10 may include other module structures capable of driving the light-emitting device EL to emit light, which may refer to the structures of the pixel circuit in the existing technologies.

The embodiment shown in FIG. 1 is used as a schematic to illustrate the connection of the data line S, the demultiplexing circuit 20, and the data writing module 101, and does not limit the real position relationship of the driving circuit 00 in the scope of the present disclosure. In various embodiments, the position of the data line S may be designed according to the actual layout of the display panel.

Figure 2:
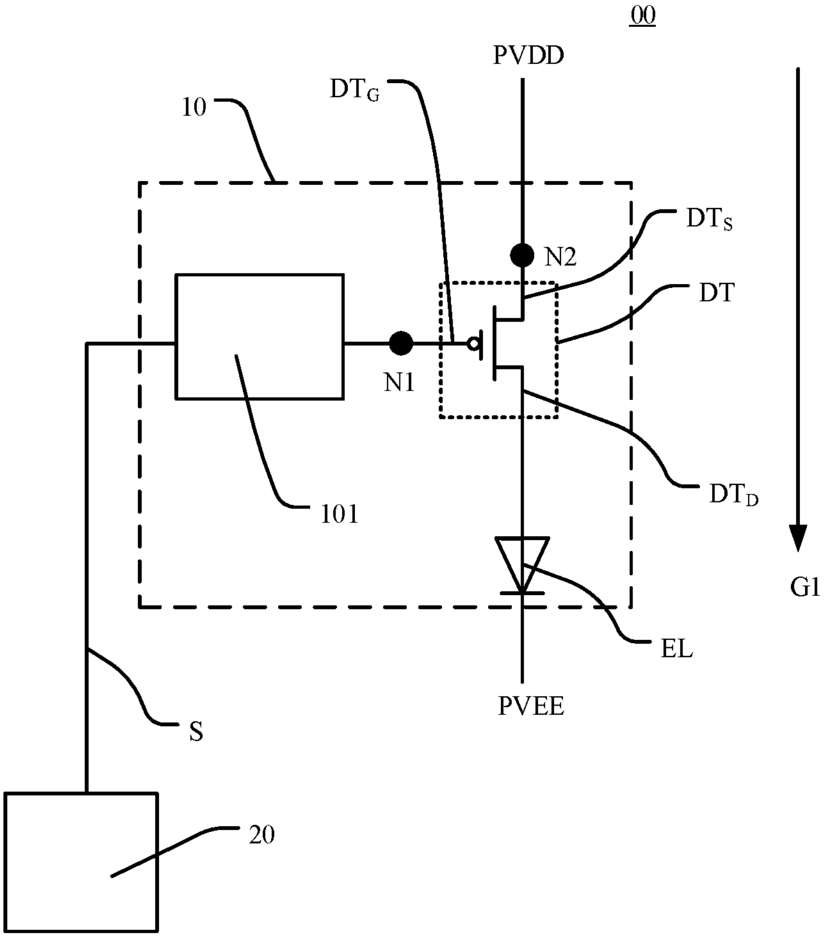
FIG. 2 illustrates another exemplary frame connection structure of a driving circuit consistent with various disclosed embodiments in the present disclosure.

FIG. 2 illustrates another frame connection structure of the driving circuit provided by another embodiment of the present disclosure. In the present embodiment, the data writing module 101 in the pixel circuit 10 may be connected to the gate $DT_G$ of the driving transistor DT.

The first power signal terminal PVDD may be connected to the source $DT_S$ of the driving transistor DT, the drain $DT_D$ of the driving transistor DT may be connected to the anode of the light-emitting device EL. The cathode of the light-emitting device EL may be connected to the second power signal terminal PVEE. The second power signal terminal PVEE may receive the second voltage signal, and may be configured for providing the second voltage signal to the pixel circuit 10.

In the present embodiment, the data writing module 101 may be connected to the gate $DT_G$ of the driving transistor DT. The data writing module 101 may be configured for transmitting the data signal of the data line S to the gate $DT_G$ of the driving transistor DT, to provide the data signal to the driving transistor DT. The first power signal terminal PVDD may be connected to the source $DT_S$ of the driving transistor DT, the drain $DT_D$ of the driving transistor DT may be connected to the anode of the light-emitting device EL, and the cathode of the light-emitting device EL may be connected to the second power signal terminal PVEE. Therefore, the first power signal terminal PVDD, the driving transistor DT, the light-emitting device EL, and the second power supply signal terminal PVEE may form a current path. The first power signal terminal PVDD may be configured for receiving the first voltage signal, the second power signal terminal PVEE may be configured for receiving the second voltage signal and providing the second voltage signal to the pixel circuit 10. The second voltage signal may be a low voltage signal, that is, the value of the first voltage signal may be greater than the value of the second voltage signal, such that the driving current generated by the driving transistor DT in the light-emitting stage may flow from the anode of the light-emitting device EL to the cathode of the light-emitting device EL.

The present disclosure has no limit on the specific values of the first voltage signal and the second voltage signal, as long as the value of the first voltage signal is greater than the value of the second voltage signal. In actual application, the specific values of the first voltage signal and the second voltage signal may be configured according to actual needs. The embodiment where the driving transistor DT is a P-type transistor is used as an example to illustrate the present disclosure, and does not limit the scope of the present disclosure. In some other embodiments, the driving transistor DT may be an N-type transistor.

In one embodiment shown in FIG. 2, the first power signal terminal PVDD may receive the first voltage signal. The first power signal terminal PVDD may be configured for providing the first voltage signal to the pixel circuit 10, and for threshold compensation of the driving transistor DT.

In the present embodiment, the threshold compensation of the driving transistor DT may be realized by the first voltage signal provided by the first power supply signal terminal PVDD. The gate $DT_G$ of the driving transistor DT may be used as the first node N1, and the source $DT_S$ of the driving transistor DT may be used as the second node N2.

During the operation of the driving circuit 00, before the driving transistor DT performs threshold compensation, that is, before the demultiplexing circuit 20 writes the data signal into the data line S, the potential of the first node N1 may be a fixed potential, and the fixed potential may be a reset voltage signal. The potential of the second node N2 may be the first voltage signal provided by the first power signal terminal PVDD. When the driving transistor DT performs threshold compensation, the first node N1 may be still at the fixed potential. Since the driving transistor DT is in an open state at this time, the drain $DT_D$ of the driving transistor DT may be connected to the second power supply signal terminal PVEE through the light-emitting device EL, such that the first node N1 is connected to the second power supply signal terminal PVEE. The power supply signal terminal PVDD, the driving transistor DT, the light-emitting device EL, and the second power supply signal terminal PVEE may form a current path (at this time, the leakage flow direction G1 of the current is shown in FIG. 2, from the first power supply signal terminal PVDD to the second power supply signal terminal PVEE). The potential of the second node N2, that is, the source $DT_S$ of the driving transistor DT, may gradually decrease until the potential difference between the first node N1 and the second node N2 is the threshold voltage Vth of the driving transistor DT. At this time, the driving transistor DT is turned off to complete the threshold compensation of the driving transistor DT. Since the threshold value compensation process of the driving transistor DT is implemented by the first voltage signal provided by the first power signal terminal PVDD, this process may not require the participation of the data signal. Correspondingly, when the driving transistor DT performs the threshold compensation, the demultiplexing circuit 20 may write the data signal provided by the driving IC (not shown in the figure) is written into the data line S, and the process of writing the data signal into the data line S by the demultiplexing circuit 20 may be that the plurality of clock signal lines CKH of the demultiplexing circuit 20 are turned on in sequence and the data signals are sequentially written on the plurality of data lines S, such that each data line S has data signals.

The threshold compensation of the driving transistor DT in this embodiment may be realized by the first voltage signal provided by the first power supply signal terminal PVDD, and may not require the participation of the data signal. Therefore, while the driving transistor DT performs the threshold value compensation, the multiplexing circuit 20 may write the data signal into the data line S. The threshold compensation of the driving transistor DT and the writing of the data signal to the data line of the demultiplexing circuit 20 may not need to be performed in sequence, but may be performed simultaneously, which may be beneficial to increase the time for threshold compensation. The driving transistor DT may be sufficiently compensated. Therefore, when the driving circuit 00 of this embodiment is applied to a display panel, the phenomenon of uneven display may be avoided, which may be beneficial to improve the uniformity of display brightness and the display effect. Further, the multiplexing circuit 20 can adopt the structure of as many clock signal lines as possible, and when the driving circuit 00 of this embodiment is applied to the display panel, it is beneficial to realize the narrow frame of the display panel while ensuring the display effect. Further, the demultiplexing circuit 20 may adopt a structure with as many clock signal lines as possible. When the driving circuit 00 of this embodiment is applied to the display panel, it may be beneficial to realize a narrow frame of the display panel while ensuring the display effect.

Figure 3:
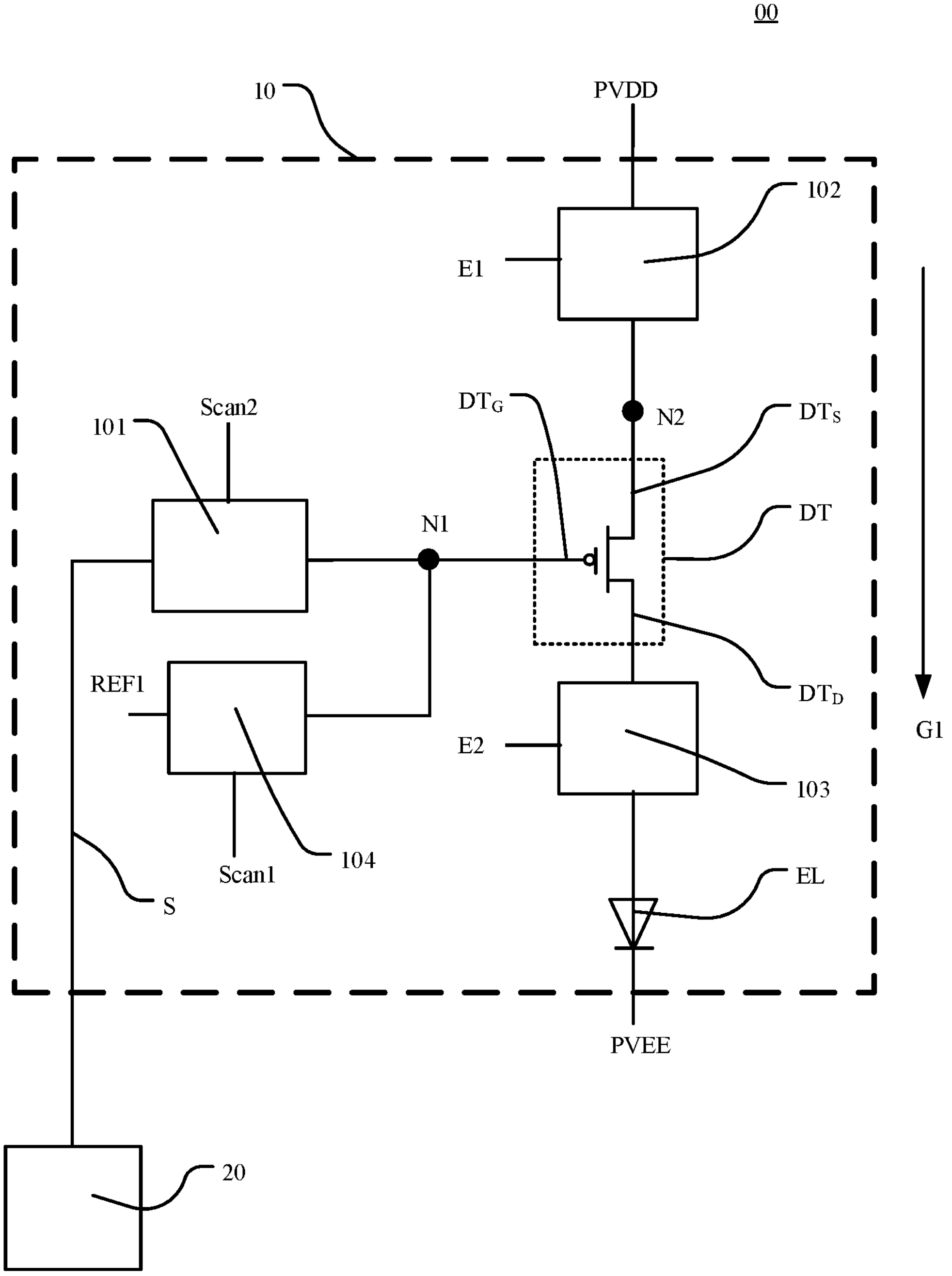
FIG. 3 illustrates another exemplary frame connection structure of a driving circuit consistent with various disclosed embodiments in the present disclosure.

In another embodiment shown in FIG. 3 which is another frame connection structure of the driving circuit, the pixel circuit 10 may further include a first light-emitting control module 102, a second light-emitting control module 103, and a first reset module 104.

The light-emitting control module 102 may be connected between the source $DT_S$ of the driving transistor DT and the first power signal terminal PVDD.

The second light-emitting control module 103 is connected between the drain $DT_D$ of the driving transistor DT and the anode of the light-emitting device EL.

An input terminal of the first reset module 104 may be connected to a first reset signal terminal REF1, and the first reset signal terminal REF1 may be configured to receive the first reset signal. An output terminal of the first reset module 104 may be connected to the gate $DT_G$ of the driving transistor DT, and the first reset signal terminal REF1 may be configured for resetting the gate $DT_G$ of the drive transistor DT.

In the present embodiment, the pixel circuit 10 may further include the first light-emitting control module 102 and the second light-emitting control module 103. One terminal of the first light-emitting control module 102 may be connected to the first power signal terminal PVDD, and the first power signal terminal PVDD may provide the first voltage signal to the first light-emitting control module 102. Another terminal of the first light-emitting control module 102 may be connected to the source $DT_S$ of the driving transistor DT. One terminal of the second light-emitting control module 103 may be connected to the drain $DT_D$ of the driving transistor DT, and another terminal of the second light-emitting control module 103 may be connected to the anode of the light-emitting device EL for realizing a closed path between the first power supply signal terminal PVDD, the first light-emitting control module 102, the driving transistor DT, the second light-emitting control module 103, the light-emitting device EL, and the second power signal terminals PVEE. Optionally, the first light-emitting control module 102 and the second light-emitting control module 103 may further include control terminals respectively, and the control terminals may be configured for inputting a light-emitting enable signal. Specifically, the first terminal of the first light-emitting control module 102 may be electrically connected to the first power signal terminal PVDD to input the first voltage signal, and the cathode of the light-emitting device EL may be electrically connected to the second power signal terminal PVEE to input the second signal terminal PVEE. The first voltage signal and the second voltage signal may have different level values, and the value of the first voltage signal may be set to be greater than the value of the second voltage signal. The control terminal of the first light-emitting control module 102 may be configured to receive the first light-emitting signal of the pixel circuit 10, and the control terminal of the second light-emitting control module 103 may be configured to receive the second light-emitting signal of the pixel circuit 10. Therefore, a current path may be provided to the light-emitting device EL in the light-emitting stage, to control the light-emitting device EL to emit light. The first light-emitting control module 102 and the second light-emitting control module 103 may be turned off in other stages (such as the reset stage or the threshold compensation stage or the data writing stage, etc.), to prevent the light-emitting device EL from emitting light during the non-emitting stage by mistake.

The pixel circuit 10 may further include the first reset module 104. The input terminal of the first reset module 104 may be connected to the first reset signal terminal REF1, and the first reset signal terminal REF1 may receive the first reset signal for providing the first reset signal for the pixel circuit 10. The output terminal of the first reset module 104 may be connected to the gate $DT_G$ of the driving transistor DT. The first reset signal terminal REF1 may reset the gate $DT_G$ of the driving transistor DT by receiving the first reset signal. Optionally, the first reset module 104 may further include a control terminal, and the control terminal may be configured to receive a first reset enable signal. The first reset enable signal may be a first scan signal. When the control terminal of the first reset module 104 is turned on in response to the first scan signal, the first reset signal of the first reset signal terminal REF1 may be transmitted to the gate $DT_G$ of the driving transistor DT. The first reset signal may include alternating high and low levels, and may reset the gate $DT_G$ of the driving transistor DT using its low-level potential. Further, the first reset signal may be a square wave signal. The pixel circuit 10 may reset the gate $DT_G$ of the driving transistor DT by setting the first reset module 104, such that the conduction of the driving transistor DT during threshold compensation may be facilitated.

The control terminal of the data writing module 101 may be configured to receive the data writing enable signal, and the data writing enable signal may be a second scan signal. When the control terminal of the data writing module 101 responds to the second scan signal, the data writing module 101 may be turned on for transmitting the data signal on the data line S to the gate $DT_G$ of the driving transistor DT to provide the driving transistor DT with the data signal.

In one embodiment, when the driving circuit 00 of this embodiment is applied to the display panel, the control terminal of the first light-emitting control module 102 may be connected to the first light-emitting signal line on the display panel, and the first terminal of the first light-emitting control module 102 may be connected to the first power line on the display panel. The control terminal of the second light-emitting control module 103 may be connected with the second light-emitting signal line on the display panel, and the cathode of the light-emitting device EL may be connected with the second power line on the display panel. The control terminal of the first reset module 104 may be connected to the first scan signal line on the display panel, and the input terminal of the first reset module 104 may be connected to the first reset signal line on the display panel. The control terminal of the data writing module 101 may be connected to the second scan signal line on the display panel. For description purposes only, this embodiment is used as an example to illustrate the present disclosure, and does not specifically limit the layout structure of the above-mentioned signal lines on the display panel. For specific implementation, reference may be made to the layout structure of the signal lines on the display panel in the existing technologies.

It should be noted that FIG. 3 in this embodiment only shows a frame structure included in the pixel circuit 10 in this embodiment. In some other embodiments, the frame structure of the pixel circuit 10 may also include other structures capable of driving the light-emitting device EL to emit light, and can be understood with reference to the structure of the pixel circuit in the existing technologies.

Figure 4:
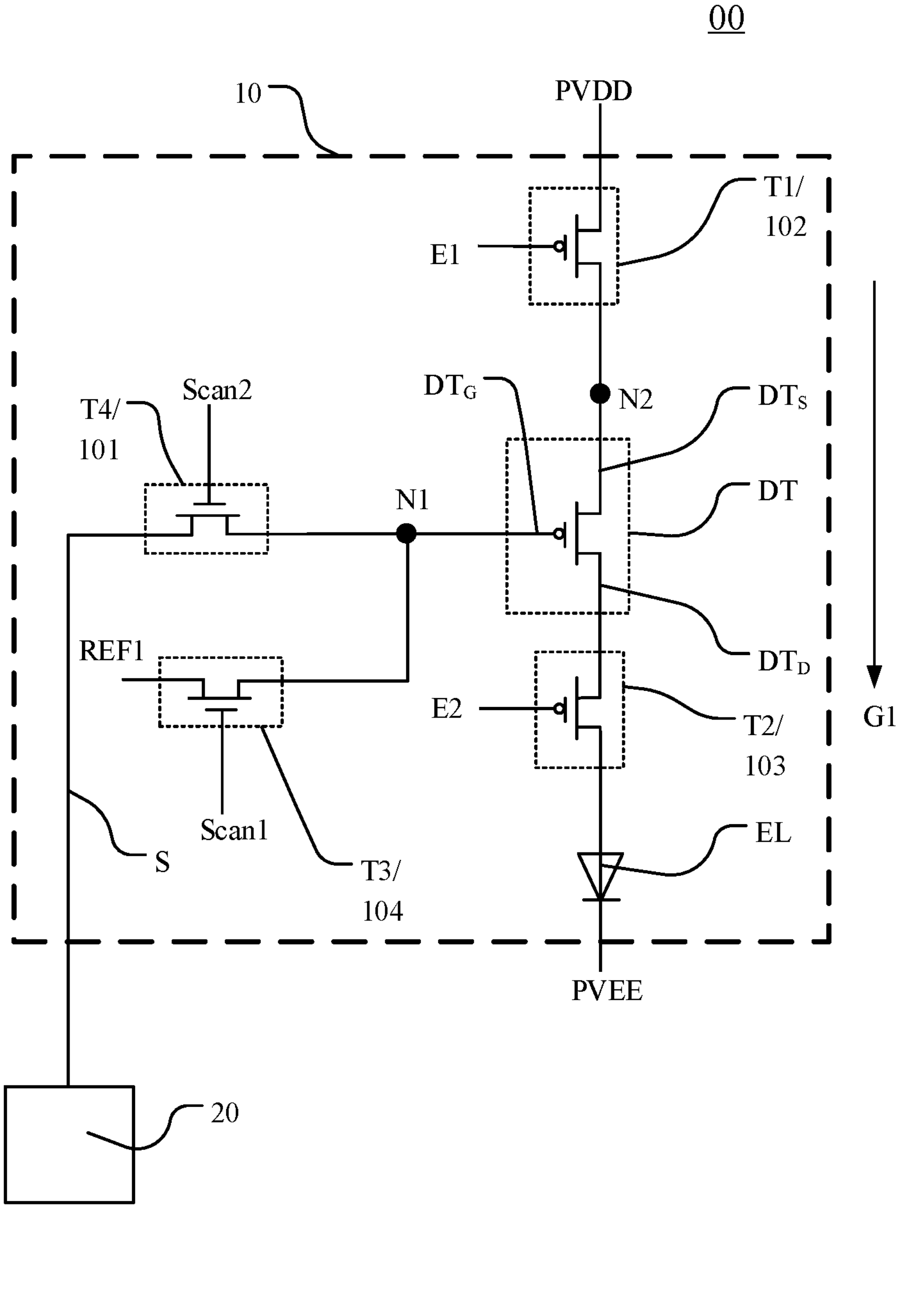
FIG. 4 illustrates a connection structure of a specific circuit of the driving circuit in FIG. 3.
Figure 5:
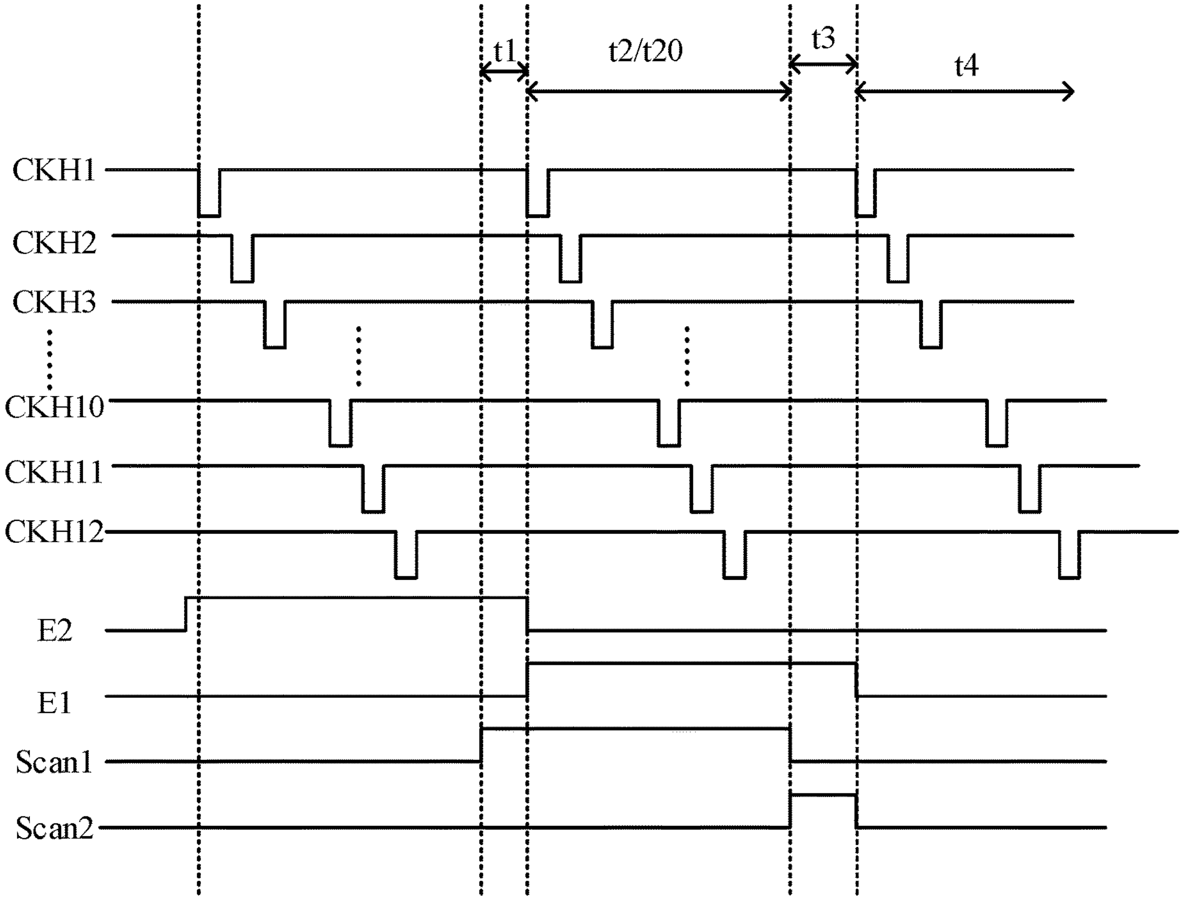
FIG. 5 illustrates a timing diagram of operation of the driving circuit in FIG. 4.

FIG. 4 may be a schematic diagram of a connection structure of a specific circuit of the driving circuit provided in FIG. 3, and FIG. 5 may be a working timing diagram corresponding to the driving circuit of FIG. 4. As shown in FIG. 3 to FIG. 5, in one embodiment, the first light-emitting control module 102 may include a first transistor T1 and a first light-emitting signal terminal E1. The first light-emitting signal terminal E1 may receive the first light-emitting signal. A gate of the first transistor T1 may be connected to the first light-emitting signal terminal E1, and a source of the first transistor T1 may be connected to the first power supply signal terminal PVDD. A drain of the first transistor T1 may be connected to the source $DT_S$ of the driving transistor DT.

The second light-emitting control module 103 may include a second transistor T2 and a second light-emitting signal terminal E2. The second light-emitting signal terminal E2 may receive the second light-emitting signal. A gate of the second transistor T2 may be connected to the second light-emitting signal terminal E2, a source of the second transistor T2 may be connected to the drain $DT_D$ of the driving transistor DT, and a drain of the second transistor T2 may be connected to the anode of the light-emitting device EL.

The first reset module 104 may include a third transistor T3 and a first scan signal terminal Scan1. The first scan signal terminal Scan1 may receive the first scan signal. A gate of the third transistor T3 may be connected to the first scan signal terminal Scan1, a source of the third transistor T3 may be connected to the first reset signal terminal REF1, and a drain of the third transistor T3 may be connected to the gate $DT_G$ of the driving transistor DT.

The data writing module 101 may include a fourth transistor T4 and a second scan signal terminal Scan2. The second scan signal terminal Scan2 may receive the second scan signal. A gate of the fourth transistor T4 may be connected to the second scan signal terminal Scan2, a source of the fourth transistor T4 may be connected to the data line S, and a drain of the fourth transistor T4 may be connected to the gate $DT_G$ of the driving transistor DT.

In one embodiment, the first transistor T1, the second transistor T2, and the driving transistor DT may be P-type transistors. In some other optional embodiments, the second transistor T2, and the driving transistor DT may be N-type transistors. When the first transistor T1, the second transistor T2, and the driving transistor DT are P-type transistors, a P-type transistor may be turned on when its gate is at a low potential. When the first transistor T1, the second transistor T2, and the driving transistor DT are N-type transistors, an N-type transistor is turned on when its gate is at a high potential. That is, to realize the conduction of the transistors, the signals provided by the first light-emitting signal terminal E1 to different types of the first transistor T1 may be opposite, the signals provided by the second light-emitting signal terminal E2 to different types of the second transistor T2 may be opposite, and the signals provided by the first node N1 to different types of the driving transistor DT may be opposite. In one embodiment, the third transistor T3 and the fourth transistor T4 may be both N-type transistors. In some other optional embodiments, the third transistor T3 and the fourth transistor T4 may also be P-type transistors. When the third transistor T3 and the fourth transistor T4 are N-type transistors, the N-type transistors are turned on when their gates are at a high potential, and when the third transistor T3 and the fourth transistor T4 are P-type transistors, the P-type transistors are turned on when their gates are at a low potential. That is, to realize the conduction of the transistors, the signals provided by the first scanning signal terminal Scan1 to different types of the third transistor T3 may be opposite, and the signals provided by the second scanning signal terminal Scan2 to different types of the fourth transistor T4 may be opposite. During specific implementation, the types of transistors may be set according to actual requirements, which is not limited in this embodiment.

In one embodiment, when the driving circuit 00 operates, as shown in FIG. 4 and FIG. 5, the demultiplexing circuit 20 may include 12 clock signal lines CKH, that is, the demultiplexing circuit 20 may adopt a demux 1:12 structure. The process of charging the data line S in the display panel with the data signal by the demultiplexing circuit 20 of this structure may be performed simultaneously with the threshold compensation of the driving transistor DT in the pixel circuit 10.

As shown in FIG. 5, before the threshold compensation stage t2, a reset stage t1 of the pixel circuit 10 may be included. In the reset stage t1 before the threshold compensation stage t2, the first scan signal at the first scan signal terminal Scan1 is at a high level, and the first scan signal at the first scan signal terminal Scan1 may be at a high level, the second scan signal of the second scan signal terminals Scan2 may be at a low level, the first light-emitting signal at the first light-emitting signal terminal E1 may be at a low level, and the second light-emitting signal at the second light-emitting signal terminal E2 may be at a high level. Correspondingly, the first transistor T1 of the first light-emitting control module 102 and the third transistor T3 of the first reset module 104 may be turned on, the second transistor T2 of the second light-emitting control module 103 and the fourth transistor T4 of the data writing module 101 may be turned off. The first reset signal of the first reset signal terminal REF1 may be transmitted to the first node N1, that is, the first reset signal of the first reset signal terminal REF1 may be transmitted to the gate $DT_G$ of the driving transistor DT. The first reset signal may use its low level to make the gate $DT_G$ of the driving transistor DT reset, that is, the gate $DT_G$ of the driving transistor DT may be at a low level at this time to make the driving transistor DT be turned on. The first voltage signal of the first power supply signal terminal PVDD may be transmitted to the second node N2, that is, the first voltage signal of the first power supply signal terminal PVDD may be transmitted to the source $DT_S$ of the driving transistor DT.

Then in the threshold compensation stage t2, the first scan signal at the first scan signal terminal Scan1 may be still at a high level, the second scan signal at the second scan signal terminal Scan2 may be still at a low level, the first light-emitting signal at the first light-emitting signal terminal E1 may change to a high level, and the second light-emitting signal of the second light-emitting signal terminal E2 may become a low level. Correspondingly, the second transistor T2 of the second light-emitting control module 103 and the third transistor T3 of the first reset module 104 may be turned on, and the first transistor T1 of the first light-emitting control module 102 and the fourth transistor T4 of the data writing module 101 may be turned off. Since the low level of the first reset signal makes the driving transistor DT be turned on, when the first transistor T1 is turned off and the second transistor is turned on, the level of the second node N2 may gradually decrease from the first voltage signal. And because the third transistor T3 is turned on, during decreasing the level of the second node N2, the level of the first node N1 may remain at the first reset signal of the first reset signal terminal REF1. Correspondingly, when the level of the second node N2 may drop to the point where the level difference between the first node N1 and the second node N2 is the threshold voltage Vth of the driving transistor DT, the driving transistor DT may be turned off, and the threshold compensation of the threshold compensation stage t2 may be completed.

Further, because the threshold compensation process of the driving transistor DT in the threshold compensation stage t2 is realized by the first voltage signal provided by the first power signal terminal PVDD, the fourth transistor T4 of the data writing module 101 may be always in the off state during this process, that is, no data may be required. Therefore, while the threshold compensation is performed by the drive transistor DT in the threshold compensation stage t2, the data signal charging stage t20 may also be completed through the demultiplexing circuit 20, that is, the operating time of the threshold compensation stage t2 and the data signal charging stage t20 may overlap. When the demultiplexing circuit 20 completes the data signal charging stage t20, the 12 clock signal lines CKH of the demultiplexing circuit 20 may be turned on sequentially to turn on the demultiplexing circuit 20, such that the data signals provided by the driving IC (not shown in the figure) are sequentially written to each data line S and each data line S has a data signal.

In existing technologies, it is generally necessary to start the threshold compensation stage t2 after the data signal charging stage t20 terminals. In the present embodiment, the threshold compensation stage t2 may be realized by the first voltage signal provided by the first power signal terminal PVDD, and may not need the participant of the data signals. Therefore, when the demultiplexing circuit 20 starts to perform the data signal charging stage t20, the threshold compensation stage t2 may be started. When the driving circuit 00 operates, the time of threshold compensation may be increased, to avoid that the time of threshold compensation stage t2 is shortened when both the threshold compensation stage t2 and the data signal charging stage t20 are carried out in sequence. When the time of the threshold compensation stage t2 and the data signal charging stage t20 overlap, the threshold compensation of the driving transistor DT may be more sufficient, and when the driving circuit 00 is applied to a display panel, the uniformity of display brightness and the display effect may be improved. Further, the demultiplexing circuit 20 may adopt the structure of as many clock signal lines as possible, and when the driving circuit 00 is applied to the display panel, it may be beneficial to realize the narrow frame of the display panel while ensuring the display effect.

Optionally, the third transistor T3 in the first reset module 104 in this embodiment may be an oxide thin film transistor, such as an Indium Gallium Zinc Oxide (IGZO) transistor. An off-state leakage current of an oxide transistor is small. Since the third transistor T3 is electrically connected to the first node N1 of the driving transistor DT, when the third transistor T3 is an oxide transistor, the leakage path of the first node N1 may be reduced and the leakage current of the pixel circuit 10 may be reduced. The potential variation range of the first node N1 may be also reduced, that is, it may be beneficial to maintain the potential of the first node N1 of the driving transistor DT, such that the driving current generated by the driving transistor DT may be more precise. Further, optionally, when the third transistor T3 may be an N-type oxide transistor, the third transistor T3 may be turned on when its gate is at a high potential.

For description purposes only, the embodiment in FIG. 5 uses the demultiplexing circuit 20 including 12 clock signal lines CKH (that is, using a demux 1:12 structure) as an example to illustrate the present disclosure, and does not limit the scope of the present disclosure. In various embodiments, the demultiplexing circuit 20 may use any suitable structure and may be configured according to actual needs.

In some embodiment, other stages, such as a stage of completing writing of the data signals into the first node N1 when the data writing module 101 is turned on or a light-emitting stage of the light-emitting device EL, may be further included, after the pixel circuit 10 in the driving circuit 00 finishes the threshold compensation stage t2. That can be made reference to the operating process of driving the light-emitting device to emit light in the pixel circuit in the existing technologies.

Figure 6:
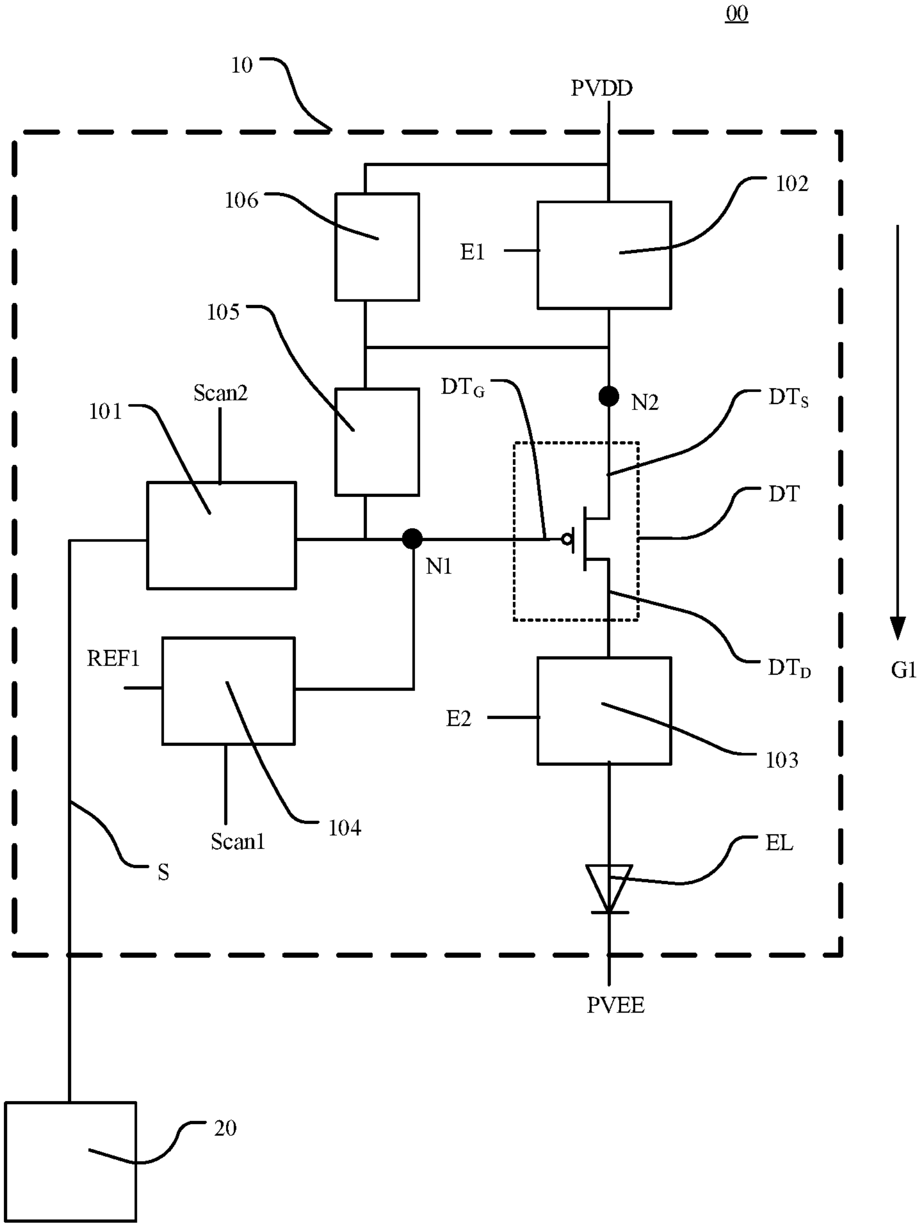
FIG. 6 illustrates another exemplary frame connection structure of a driving circuit consistent with various disclosed embodiments in the present disclosure.

In another embodiment shown in FIG. 6 which is a schematic diagram of another frame connection structure of the driving circuit, the pixel circuit 10 may include a first light-emitting control module 102, a second light-emitting control module 103, a first reset module 104, a coupling module 105, and a storage module 106. The coupling module 105 may be connected between the gate $DT_G$ and the source $DT_S$ of the driving transistor DT, and the storage module 106 may be connected between the first power supply signal terminal PVDD and the source $DT_S$ of the driving transistor DT.

In the present embodiment, the pixel circuit 10 may be further provided with the coupling module 105 and the storage module 106. The coupling module 105 may be connected between the gate $DT_G$ and the source $DT_S$ of the driving transistor DT. That is, one terminal of the coupling module 105 may be connected to the gate $DT_G$ of the driving transistor DT, and another terminal of the coupling module 105 may be connected to the source $DT_S$ of the driving transistor DT. One terminal of the storage module 106 may be connected to the first power signal terminal PVDD, and another terminal may be connected to the source $DT_S$ of the drive transistor DT. The storage module 106 may be configured to lower the potential of the second node N2 through the charge leakage current stored in the storage module 106 itself in the threshold compensation stage after the first light-emitting control module 102 is turned off, to better realize that potential difference between the gate $DT_G$ and the source $DT_S$ of the driving transistor DT reaches the threshold voltage Vth. The threshold compensation of the driving transistor DT may be finished more sufficiently. The coupling module 105 may be configured to: after the potential of the first node N1 (that is, the gate $DT_G$ of the driving transistor DT) changes after being written the data signal when the data writing module 101 is turned on in the data writing stage after the threshold compensation of the driving transistor DT is completed, synchronously couple the potential change of the first node N1 to the second node N2 (that is, the source $DT_S$ of the driving transistor DT), such that the potential of the second node N2 changes with the potential change of the first node N1. Therefore, the driving transistor DT may be kept being turned on to realize subsequent light emission.

Figure 7:
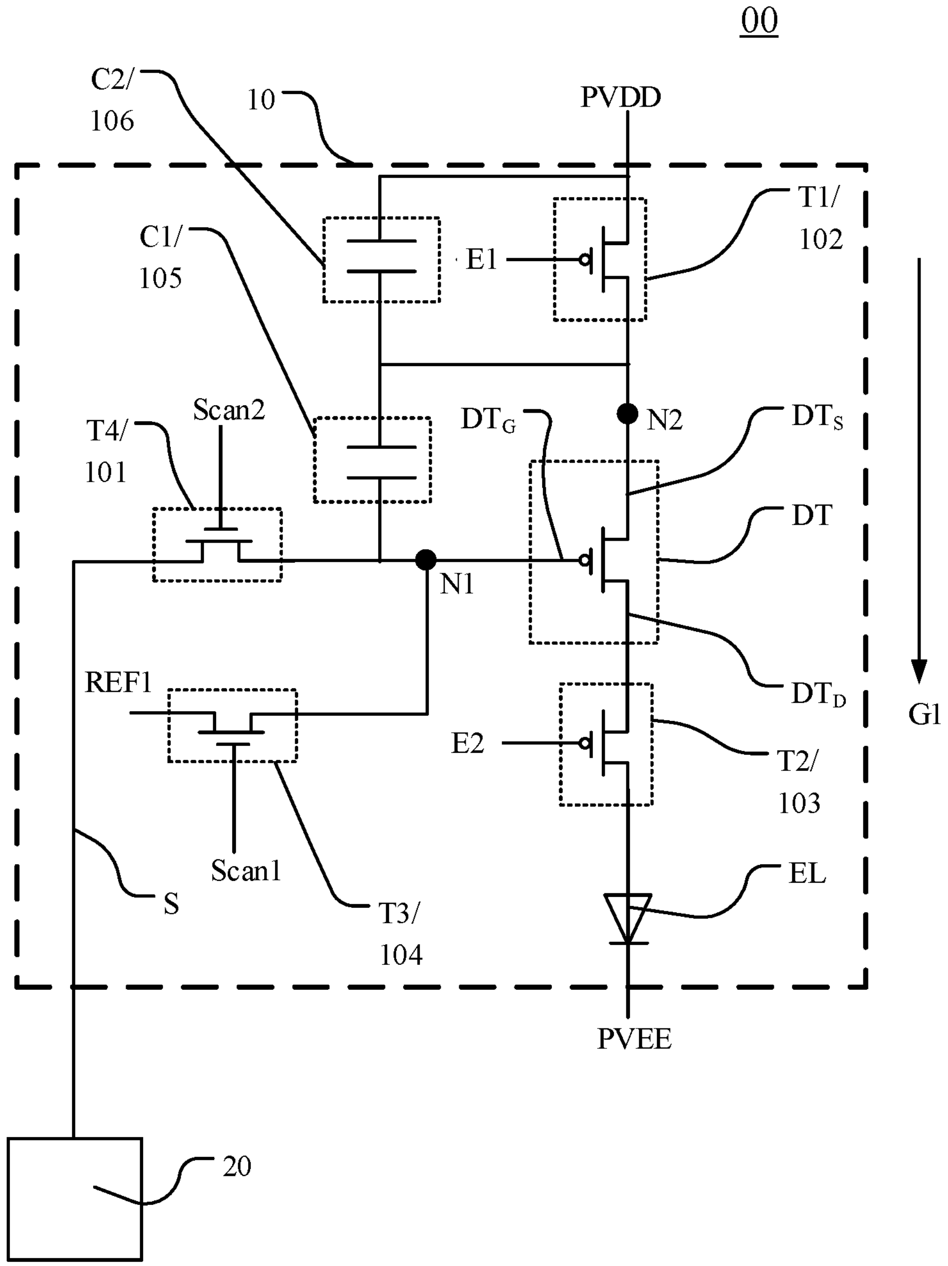
FIG. 7 illustrates a connection structure of a specific circuit of the driving circuit in FIG. 6.

As shown in FIG. 5, FIG. 6, and FIG. 7 which is a circuit connection structure of the driving circuit in FIG. 6, in one embodiment, the coupling module 105 may include a first capacitor C1. A first electrode of the first capacitor C1 may be connected to the gate $DT_G$ of the driving transistor DT, and a second electrode of the first capacitor C1 may be connected to the source $DT_S$ of the driving transistor DT.

The storage module 106 may include a second capacitor C2. A first electrode of the second capacitor C2 may be connected to the first power signal terminal PVDD, and a second electrode of the second capacitor C2 may be connected to the source $DT_S$ of the driving transistor DT.

In one embodiment, when the driving circuit 00 operates, as shown in FIG. 5 and FIG. 7, the demultiplexing circuit 20 may include 12 clock signal lines CKH, that is, the demultiplexing circuit 20 may adopt a demux 1:12 structure. The process of charging the data line S in the display panel with the data signal by the demultiplexing circuit 20 of this structure may be performed simultaneously with the threshold compensation of the driving transistor DT in the pixel circuit 10.

In the reset stage t1, the first scan signal at the first scan signal terminal Scan1 may be at a high level, and the first scan signal at the first scan signal terminal Scan1 may be at a high level, the second scan signal of the second scan signal terminals Scan2 may be at a low level, the first light-emitting signal at the first light-emitting signal terminal E1 may be at a low level, and the second light-emitting signal at the second light-emitting signal terminal E2 may be at a high level. Correspondingly, the first transistor T1 of the first light-emitting control module 102 and the third transistor T3 of the first reset module 104 may be turned on, the second transistor T2 of the second light-emitting control module 103 and the fourth transistor T4 of the data writing module 101 may be turned off. The first reset signal of the first reset signal terminal REF1 may be transmitted to the first node N1, that is, the first reset signal of the first reset signal terminal REF1 may be transmitted to the gate $DT_G$ of the driving transistor DT. The first reset signal may use its low level to make the gate $DT_G$ of the driving transistor DT reset, that is, the gate $DT_G$ of the driving transistor DT may be at a low level at this time to make the driving transistor DT be turned on. The first voltage signal of the first power supply signal terminal PVDD may be transmitted to the second node N2, that is, the first voltage signal of the first power supply signal terminal PVDD may be transmitted to the source $DT_S$ of the driving transistor DT. That is, N1=Vref1, N2=Vpvdd.

Then in the threshold compensation stage t2, the first scan signal at the first scan signal terminal Scan1 may be still at a high level, the second scan signal at the second scan signal terminal Scan2 may be still at a low level, the first light-emitting signal at the first light-emitting signal terminal E1 may change to a high level, and the second light-emitting signal of the second light-emitting signal terminal E2 may become a low level. Correspondingly, the second transistor T2 of the second light-emitting control module 103 and the third transistor T3 of the first reset module 104 may be turned on, and the first transistor T1 of the first light-emitting control module 102 and the fourth transistor T4 of the data writing module 101 may be turned off. Since the low level of the first reset signal makes the driving transistor DT be turned on, when the first transistor T1 is turned off and the second transistor is turned on, the level of the second node N2 may gradually decrease from the first voltage signal VPcdd. Further, since the first transistor T1 of the first light-emitting control module 102 is turned off, the charge stored in the second capacitor C2 of the storage module 106 may leak, further reducing the potential of the second node N2. Since the third transistor T3 is turned on, during decreasing the level of the second node N2, the level of the first node N1 may remain at the first reset signal Vref1 of the first reset signal terminal REF1. Correspondingly, when the level of the second node N2 may drop to the point where the level difference between the first node N1 and the second node N2 is the threshold voltage Vth of the driving transistor DT. That is, N1=Vref1, N2=N1+|Vth|=Vref1+|Vth|. The driving transistor DT may be turned off, and the threshold compensation of the threshold compensation stage t2 may be completed.

Further, because the threshold compensation process of the driving transistor DT in the threshold compensation stage t2 is realized by the first voltage signal provided by the first power signal terminal PVDD and the second capacitor C2 of the storage module, the fourth transistor T4 of the data writing module 101 may be always in the off state during this process, that is, no data may be required. Therefore, while the threshold compensation is performed by the drive transistor DT in the threshold compensation stage t2, the data signal charging stage t20 may also be completed through the demultiplexing circuit 20, that is, the operating time of the threshold compensation stage t2 and the data signal charging stage t20 may overlap. When the demultiplexing circuit 20 completes the data signal charging stage t20, the 12 clock signal lines CKH of the demultiplexing circuit 20 may be turned on sequentially to turn on the demultiplexing circuit 20, such that the data signals provided by the driving IC (not shown in the figure) are sequentially written to each data line S and each data line S has a data signal.

In the data writing stage t3, the first scan signal of the first scan signal terminal Scan1 may become a low level, the second scan signal of the second scan signal terminal Scan2 may become a high level, the first light-emitting signal of the first light-emitting signal terminal E1 may still be at a high level, and the second light-emitting signal of the second light-emitting signal terminal E2 may be still at a low level. Therefore, the second transistor T2 of the second light-emitting control module 103 and the fourth transistor T4 of the data writing module 101 may be turned on, and the first transistor T1 of the first light-emitting control module 102 and the third transistor T3 of the first reset module 104 may be turned off. The data signal Vdata on the data line S may be transmitted to the first node N1 through the fourth transistor T4, that is, N1=Vdata. Because of the coupling effect of the first capacitor C1 in the coupling module 105, the potential change of the first node N1 may be synchronously coupled to the second node N2 (that is, the source $DT_S$ of the driving transistor DT), such that the potential of the second node N2 is $N2=(\text{current } N1-\text{original } N1)\times C1/(C1+C2)+\text{original } N2=(Vdata-Vref1)\ C1/(C1+C2)+Vref1+|Vth|$. The potential of the second node N2 may change following the potential change of the first node N, such that the driving transistor DT is kept turned on and is ready to be turned on for the subsequent realization of the light-emitting purpose.

In the light-emitting stage t4, the first scan signal of the first scan signal terminal Scan1 may be still at a low level, the second scan signal of the second scan signal terminal Scan2 may become a low level, and the first light-emitting signal of the first light-emitting signal terminal E1 may become a low level, the second light-emitting signal of the second light-emitting signal terminal E2 may be still at low level. Therefore, the first transistor T1 of the first light-emitting control module 102 and the second transistor T2 of the second light-emitting control module 103 may be turned on, and the fourth transistor T4 of the data writing module 101 and the third transistor T3 of the first reset module 104 may be in the off state. The first voltage signal Vpvdd of the first power signal terminal PVDD may be transmitted to the second node N2, and the potential of the second node N2 may become $N2=Vpvdd$. The voltage variation of the second node $\Delta N2=Vpvdd-[(Vdata-Vref1)\times C1/(C1+C2)+Vref1+|Vth|]$ may be calculated. Because the coupling effect of the first capacitor C1 of the coupling module 105, the potential of the first node N1 may also change, and become $N1=Vdata+Vpvdd-[(Vdata-Vref1)\times C1/(C1+C2)+Vref1+|Vth|]$. The light-emitting current of the light-emitting device may be EL $Id=k\times(Vgs-|Vth|)_2$, $Vgs=N2-N1$, such that $N2-N1-|Vth|=Vpvdd-Vdata-Vpvdd+[(Vdata-Vref1)\times C1/(C1+C2)+Vref1+|Vth|]-|Vth|=(Vdata-Vref1)\times C1/(C1+C2)+Vref1-Vdata=(Vref1-Vdata)\times[1-C1/(C1+C2)]=C2/(C1+C2)\times(Vref1-Vdata)$, the light-emitting current Id of the light-emitting device EL may be $Id=k\times(N2-N1-|Vth|)2=k\times[C2/(C1+C2)\times(Vref1-Vdata)]2=k\times(Vref1-Vdata)2$, where $k'=k\times C22/(C1+C2)2$, the constant k is related to the performance of the driving transistor DT itself, and k' is a new constant. The driving transistor DT may generate the above-mentioned light-emitting current, to drive the light-emitting device EL to emit light.

For description purposes only, the present embodiment uses the connection structure of the driving circuit in FIG. 7 as an example to illustrate the operation stage of the driving circuit provided by the present disclosure, and does not limit the scope of the present disclosure. In various embodiments, the operation process of the driving circuit may further include other suitable stages.

Figure 8:
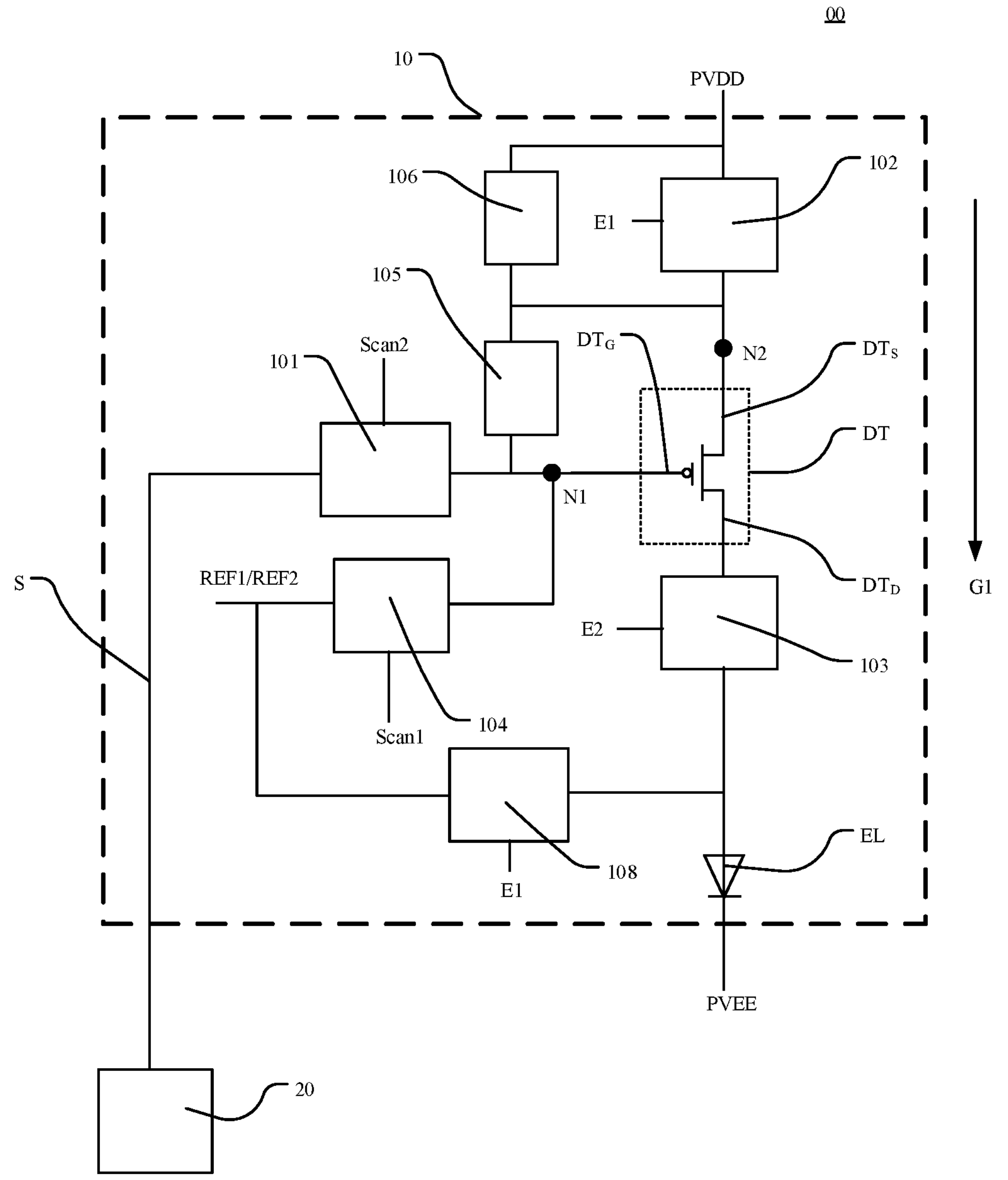
FIG. 8 illustrates another exemplary frame connection structure of a driving circuit consistent with various disclosed embodiments in the present disclosure.

Another embodiment shown in FIG. 8 provides another driving circuit. FIG. 8 is a frame connection structure of the driving circuit in the present embodiment. As shown in FIG. 8, the pixel circuit 10 may include a first light-emitting control module 102, a second light-emitting control module 103, a first reset module 104, and a second reset module 108. An input terminal of the second reset module 108 may be connected to the second reset signal terminal REF2, and the second reset signal terminal REF2 may receive the second reset signal Vref2. An output terminal of the second reset module 108 may be connected to the anode of the light-emitting device EL, and the second reset signal terminal REF2 may be configured to reset the anode of the light-emitting device EL.

The pixel circuit 10 may further include the second reset module 108. The input terminal of the second reset module 108 may be connected to the second reset signal terminal REF2, and the output terminal of the second reset module 108 may be connected to the anode of the light-emitting device EL. Optionally, the second reset module 108 may further include a control terminal, and the control terminal may be configured to receive the second reset enable signal. The second reset enable signal may be the first light-emitting signal, that is, the control terminal of the second reset module 108 may be connected to the first light-emitting signal terminal E1. When the control terminal of the second reset module 108 is turned on in response to the first light-emitting signal of the first light-emitting signal terminal E1, the second reset signal Vref2 of the second reset signal terminal REF2 may be transmitted to the anode of the light-emitting device EL. The anode of the light-emitting device EL may be reset to initialize the anode of the light-emitting device EL, thereby improving the residual of the previous frame of data signal, improving the afterimage phenomenon, and improving the display effect when the driving circuit 00 is applied to the display panel.

Figure 9:
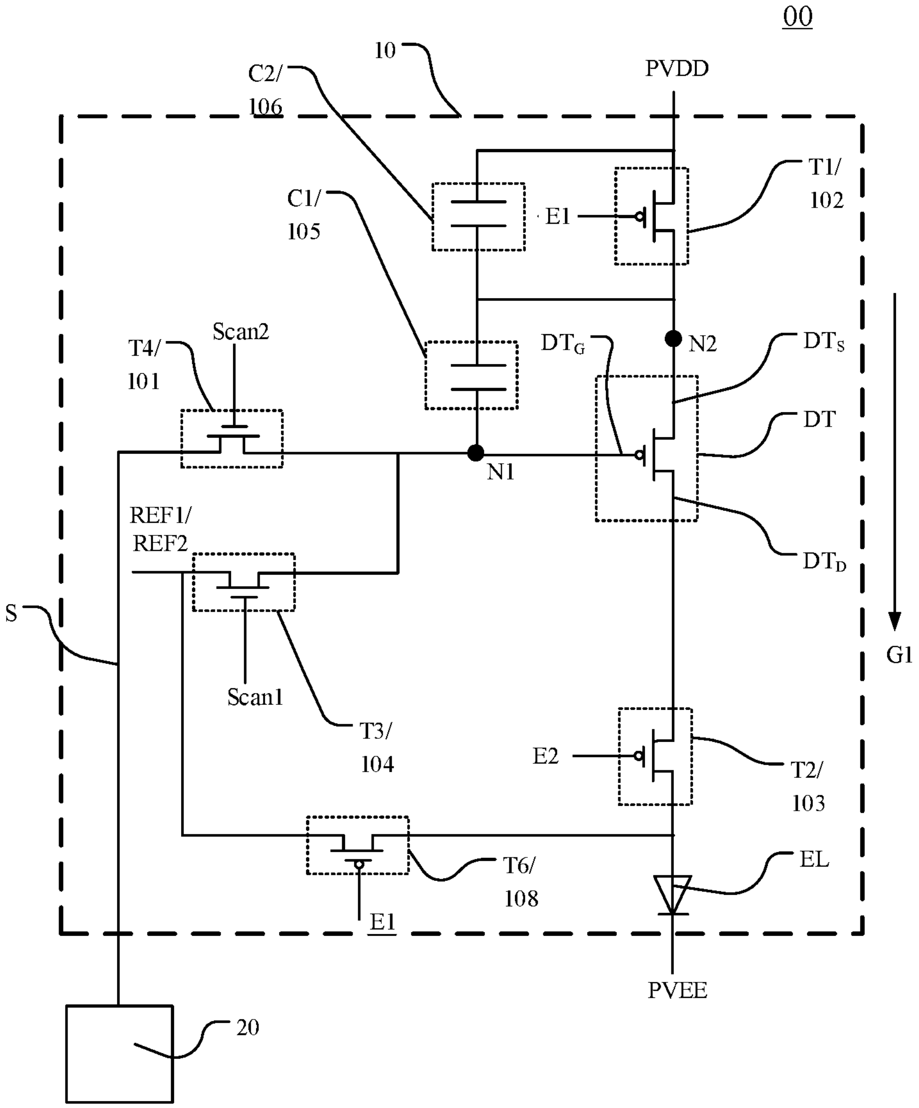
FIG. 9 illustrates a connection structure of a specific circuit of the driving circuit in FIG. 8.

As shown in FIG. 8 and FIG. 9 which is a circuit structure of the driving circuit in FIG. 8, the second reset module 108 may include a sixth transistor T6. A gate of the sixth transistor T6 may be connected to the first light-emitting signal terminal E1, a source of the sixth transistor T6 may be connected to the second reset signal terminal REF2, and the second reset signal terminal REF2 may be connected to the first reset signal terminal REF1. A drain of the sixth transistor T6 may be connected to the anode of the light-emitting device EL.

It can be understood that, as shown in FIGS. 8 and 9, the second reset signal terminal REF2 in this embodiment may be connected to the first reset signal terminal REF1, that is, the input terminal of the first reset module 104 and the input terminal of the second reset module 108 may be connected together to provide the same first reset signal Vref1 and second reset signal Vref2. In some other optional embodiments, the second reset signal terminal REF2 and the first reset signal terminal REF1 may be independent of each other, that is, the first reset signal Vref1 and the second reset signal Vref2 may be different (this embodiment is not illustrated in the drawings). During specific implementation, settings can be selected according to actual needs, which is not limited in this embodiment.

The embodiment where the sixth transistor T6 is a P-type transistor is used as an example to illustrate the present disclosure, and does not limit the scopes of the present disclosure. In some other embodiments, the sixth transistor T6 may be an N-type transistor. When the sixth transistor T6 is a P-type transistor, the P-type transistor is turned on when its gate is at a low potential. When the sixth transistor T6 an N-type transistor, the N-type transistor is turned on when its gate is at a high potential. That is, to realize the conduction of the transistor, the signals provided by the first light-emitting signal terminal E1 to the sixth transistor T6 of different types are opposite.

Figure 10:
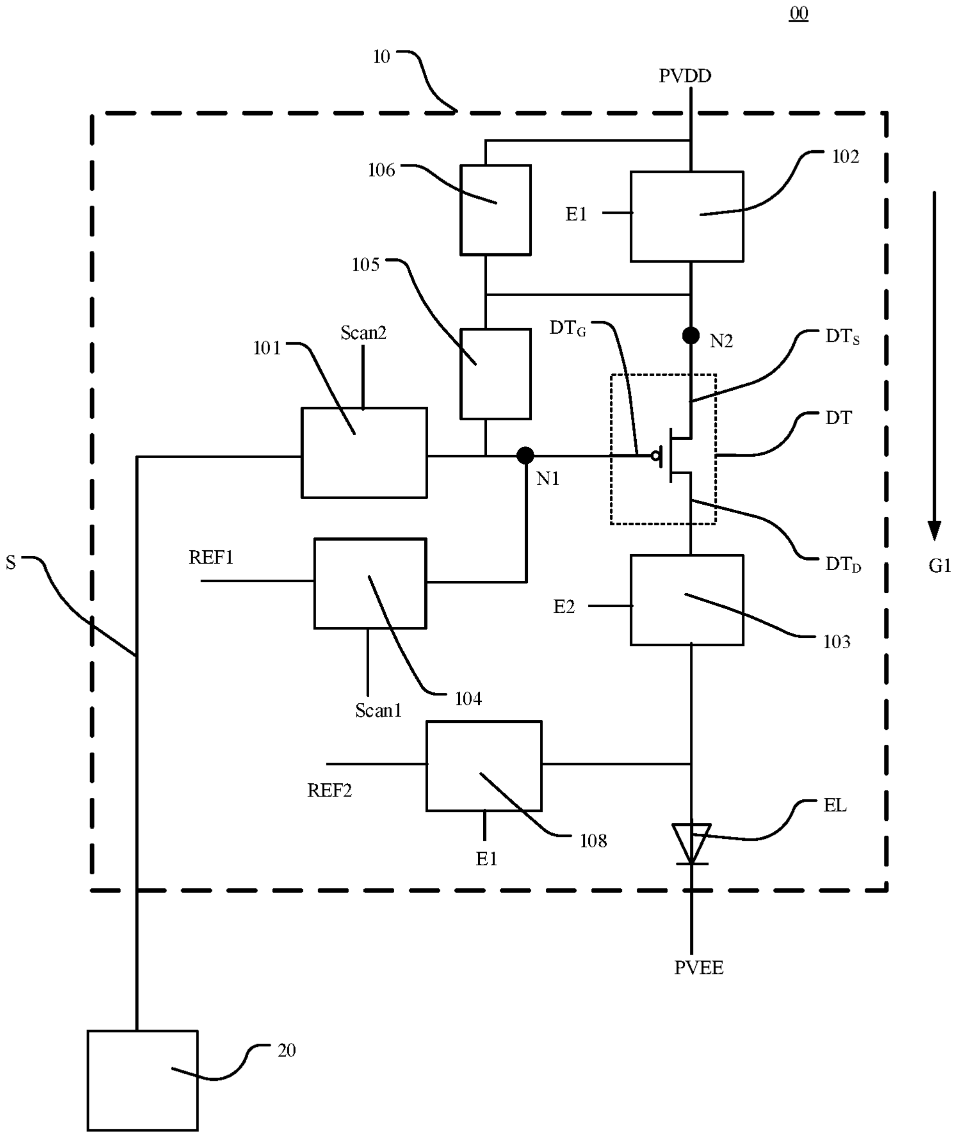
FIG. 10 illustrates another exemplary frame connection structure of a driving circuit consistent with various disclosed embodiments in the present disclosure.
Figure 11:
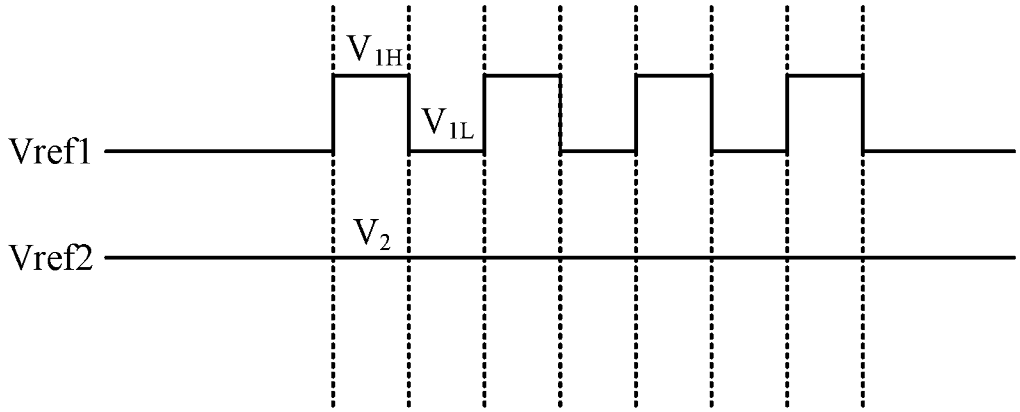
FIG. 11 illustrates an exemplary timing diagram of a first reset signal and a second reset signal in FIG. 10.

In another embodiment shown in FIG. 10 which is the frame connection structure of another driving circuit and FIG. 11 which is the timing diagram of the first reset signal Vref1 and the second reset signal Vref2, the pixel circuit 10 may include a first light-emitting control module 102, a second light-emitting control module 103, a first reset module 104, and a second reset module 108. An input terminal of the second reset module 108 may be connected to the second reset signal terminal REF2, and the second reset signal terminal REF2 may receive the second reset signal Vref2. An output terminal of the second reset module 108 may be connected to the anode of the light-emitting device EL, and the second reset signal terminal REF2 may be configured to reset the anode of the light-emitting device EL.

Values of the first reset signal Vref1 and the second reset signal Vref2 may be different.

The pixel circuit 10 may include the first reset module 104 and the second reset module 108. The input terminal of the first reset module 104 may be connected to the first reset signal terminal REF1. The first reset signal terminal REF1 may receive the first reset signal and is configured to provide the first reset signal Vref1 for the pixel circuit 10. The output terminal of the first reset module 104 may be connected to the gate $DT_G$ of the driving transistor DT, and the first reset signal terminal REF1 may reset the gate $DT_G$ of the driving transistor DT through the received first reset signal Vref1. Thus, the driving transistor DT may be turned on during the threshold compensation. The input terminal of the second reset module 108 may be connected to the second reset signal terminal REF2, and the output terminal of the second reset module 108 may be connected to the anode of the light-emitting device EL. The second reset signal Vref2 of the second reset signal terminal REF2 may be transmitted to the anode of the light-emitting device EL. The anode of the light-emitting device EL may be reset to initialize the anode of the light-emitting device EL, thereby improving the residual of the previous frame of data signal, improving the afterimage phenomenon, and improving the display effect when the driving circuit 00 is applied to the display panel.

The value of the first reset signal Vref1 in this embodiment may be different from the value of the second reset signal Vref2. That is, when the driving circuit 00 of this embodiment is applied to the display panel, the first reset signal terminal REF1 and the second reset signal terminal REF2 may be electrically connected to different reset signal lines, such that the first reset module 104 and the second reset module 108 use different reset signals to reset the gate $DT_G$ of the driving transistor DT and the anode of the light-emitting device EL. Optionally, the value of the first reset signal Vref1 may be greater than the value of the second reset signal Vref2. As shown in FIG. 11, when the first reset signal Vref1 is a square wave signal, the first reset signal Vref1 includes a low level V1L and a high level V1H. The low potential V1L of the first reset signal Vref1 may be greater than the potential V2 of the second reset signal Vref2. If the potential of the first reset signal Vref1 is too low, when the data writing module 101 in the data writing stage writes the fixed data signal into the gate $DT_G$ of the driving transistor DT, the first reset signal Vref1 may pull down the original potential of the gate $DT_G$ of the driving transistor DT to a very low level, and the gate $DT_G$ of the driving transistor DT may be not fully charged. The potential value of the second reset signal Vref2 may be expected to be lower, to reset the anode of the light-emitting device EL more thoroughly, and avoid the occurrence of sub-pixel stealth caused by lateral leakage current between the light-emitting devices EL of adjacent sub-pixels.

Figure 12:
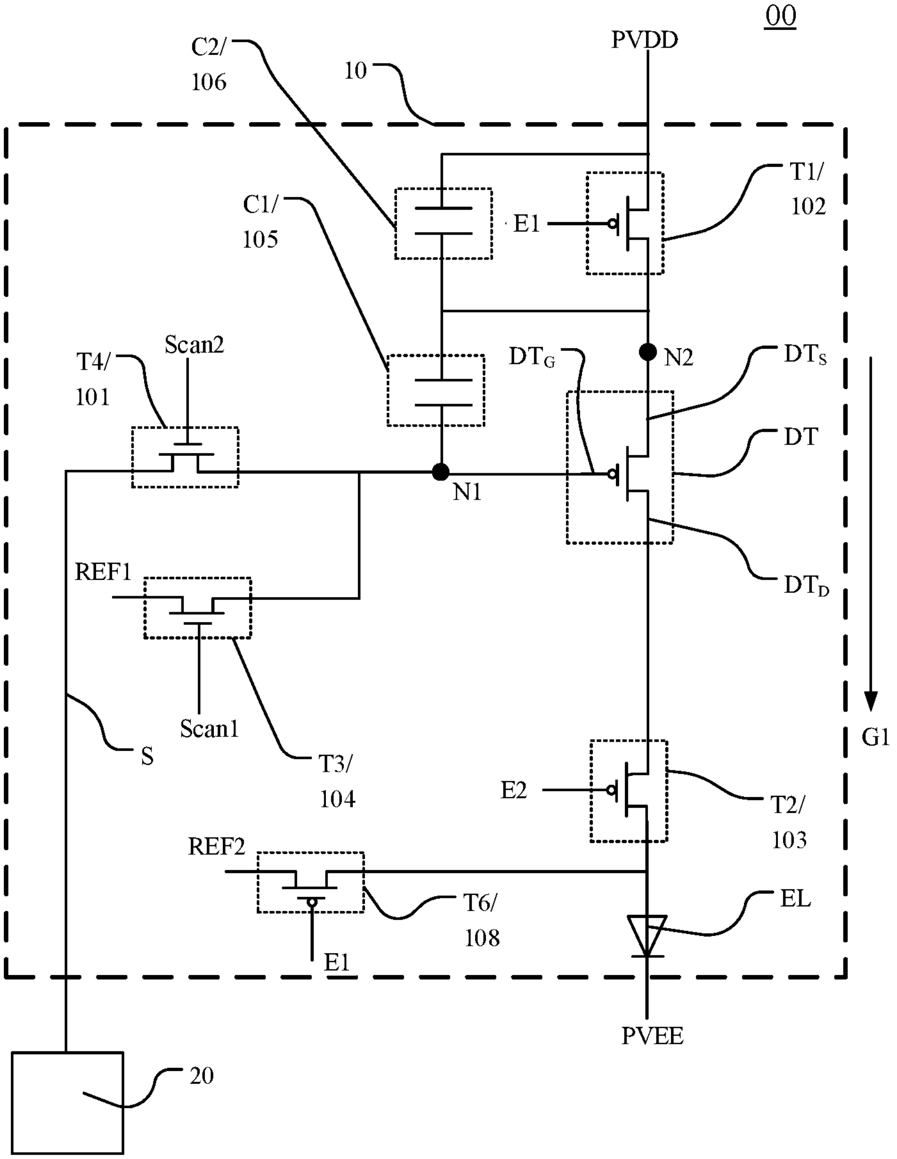
FIG. 12 illustrates a connection structure of a specific circuit of the driving circuit in FIG. 10.

As shown in FIG. 10 and FIG. 12 which is a circuit structure of the driving circuit in FIG. 10, the second reset module 108 may include a sixth transistor T6. A gate of the sixth transistor T6 may be connected to the first light-emitting signal terminal E1, a source of the sixth transistor T6 may be connected to the second reset signal terminal REF2, and the second reset signal terminal REF2 may be independent from the first reset signal terminal REF1. A drain of the sixth transistor T6 may be connected to the anode of the light-emitting device EL.

In the present embodiment, the second reset signal terminal REF2 and the first reset signal terminal REF1 may be set to be independent of each other, and the value of the first reset signal Vref1 may be different from the value of the second reset signal Vref2. When the second reset signal Vref2 needs to be pulled down to improve the occurrence of sub-pixel stealth of the light-emitting device, the low level of the first reset signal Vref1 may not need to be pulled down as the second reset signal Vref2 is pulled down, such that the low level V1L of the first reset signal Vref1 could be higher than the potential V2 of the second reset signal Vref2 after being pulled down. The data signal may be written based on a slightly higher low potential V1L when the data signal is written into the gate $DT_G$ of the driving transistor DT after the gate $DT_G$ of the driving transistor DT is reset. Therefore, the voltage difference between the initial potential of the gate $DT_G$ of the driving transistor DT and the data signal to be written may be reduced, such that the data signal could be written more fully in the data writing stage.

It can be understood that this embodiment does not specifically limit the types of the first reset signal Vref1 and the second reset signal Vref2. The first reset signal Vref1 and the second reset signal Vref2 may both be DC signals; or the first reset signal Vref1 may be a square wave AC signal and the second reset signal Vref2 may be a DC signal; or the first reset signal Vref1 and the second reset signal Vref2 may also be other types of signals, as long as the value of the first reset signal Vref1 is greater than that of the second reset signal Vref2. The present disclosure has no limit on this.

The embodiment where the sixth transistor T6 is a P-type transistor is used as an example to illustrate the present disclosure, and does not limit the scopes of the present disclosure. In some other embodiments, the sixth transistor T6 may be an N-type transistor. When the sixth transistor T6 is a P-type transistor, the P-type transistor is turned on when its gate is at a low potential. When the sixth transistor T6 an N-type transistor, the N-type transistor is turned on when its gate is at a high potential. That is, to realize the conduction of the transistor, the signals provided by the first light-emitting signal terminal E1 to the sixth transistor T6 of different types are opposite.

Figure 13:
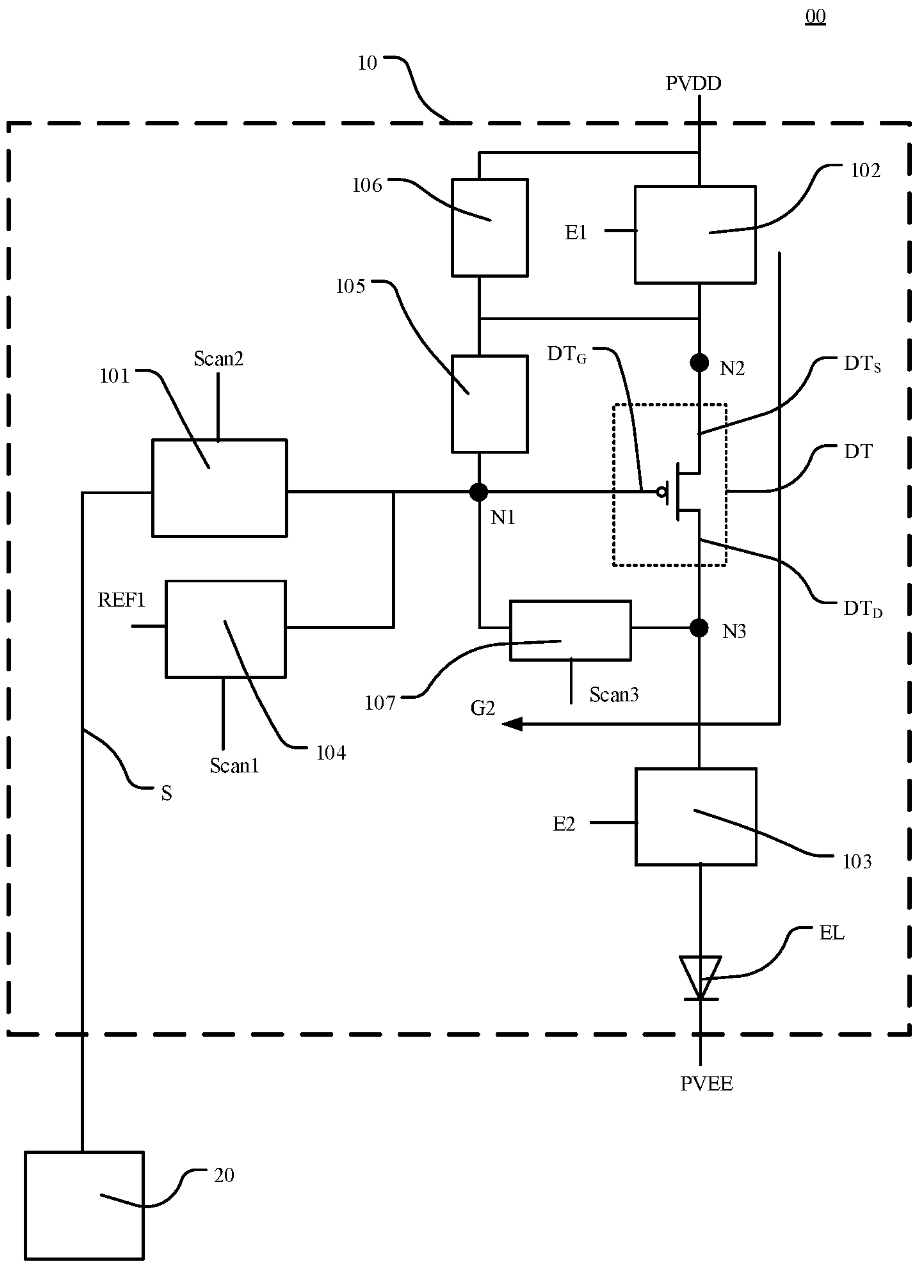
FIG. 13 illustrates another exemplary frame connection structure of a driving circuit consistent with various disclosed embodiments in the present disclosure.

In another embodiment shown in FIG. 13 which is the frame connection structure of another driving circuit, the pixel circuit 10 may include a first light-emitting control module 102, a second light-emitting control module 103, a first reset module 104, a coupling module 105, and a storage module 106. The coupling module 105 may be connected between the gate $DT_G$ and the source $DT_S$ of the driving transistor DT, and the storage module 106 may be connected between the first power supply signal terminal PVDD and the source $DT_S$ of the driving transistor DT.

The first light-emitting control module 102 may be connected between the source $DT_S$ of the driving transistor DT and the first power signal terminal PVDD and the second light-emitting control module 103 may be connected between the drain $DT_D$ of the driving transistor DT and the anode of the light-emitting device EL. The input terminal of the first reset module 104 may be connected to the first reset signal terminal REF1. The first reset signal terminal REF1 may receive the first reset signal and is configured to provide the first reset signal Vref1 for the pixel circuit 10. The output terminal of the first reset module 104 may be connected to the gate $DT_G$ of the driving transistor DT, and the first reset signal terminal REF1 may reset the gate $DT_G$ of the driving transistor DT through the received first reset signal Vref1.

The circuit board may further include a brightness adjustment module 107 between the first reset module 104 and the drain $DT_D$ of the driving transistor DT. The brightness adjustment module 107 may provide the first reset signal Vref1 for the drain $DT_D$ of the driving transistor DT, and may be used connecting the first power signal terminal PVDD and the first reset module when performing the threshold compensation on the driving transistor DT.

In the present disclosure, the pixel circuit may further include the brightness adjustment module 107. One terminal of the brightness adjustment module 107 may be connected to the drain $DT_D$ of the driving transistor DT. The drain $DT_D$ of the driving transistor DT may be used as a third node N3. Another terminal of brightness adjustment module 107 may be connected to the first rest module 104. As shown in FIG. 13, another terminal of the brightness adjustment module 107 may be connected to the first node N1, and the output terminal of the first reset module 104 may be connected to the first node N1, such that the another terminal of the brightness adjustment module 107 is electrically connected to the first reset module 104 electrical. Optionally, the brightness adjustment module 107 may further include a control terminal for receiving a third scan signal. The brightness adjustment module 107 may be turned on when the control terminal of the brightness adjustment module 107 responds to the third scan signal, such that the first power signal terminal PVDD and the first reset module 104 are connected.

In this embodiment, the threshold compensation of the driving transistor DT may still be achieved by the first voltage signal provided by the first power supply signal terminal PVDD. During the operation of the driving circuit 00, before the driving transistor DT performs threshold compensation, that is, before the demultiplexing circuit 20 writes the data signals into the data lines S, the potential of the first node N1 may be a fixed potential, and the fixed potential may be the first reset voltage signal. The potential of the second node N2 may be the first voltage signal provided by the first power signal terminal PVDD. When the driving transistor DT performs threshold compensation, the first node N1 may be still at the fixed potential. Since the driving transistor DT is in a turn-on state at this time, the drain $DT_D$ of the driving transistor DT (that is, the third node N3) may be connected to the first reset module 104. The first reset signal Vref1 may be provided for the drain $DT_D$ of the driving transistor DT, and the first voltage signal of the first power signal terminal PVDD may be greater than the first reset signal Vref1, such that the first power signal terminal PVDD, the driving transistor DT, and the brightness adjustment module 107, the first reset module 104, the first reset signal terminal REF1 form a current path (the current leakage direction G2 is shown in FIG. 13, from the first power signal terminal PVDD to the first reset signal terminal REF1). The potential of the second node N2, that is, the source $DT_S$ of the driving transistor DT, may gradually decrease until the potential difference between the first node N1 and the second node N2 reaches the threshold voltage Vth of the driving transistor DT. Then the driving transistor DT may be turned off, and the threshold compensation of the driving transistor DT may be completed. Since the threshold compensation of the driving transistor DT is implemented by the first voltage signal provided by the first power signal terminal PVDD, the process may not require the participation of the data signals. Therefore, when the driving transistor DT performs the threshold compensation, the demultiplexing circuit 20 may write the data signals provided by the driving IC (not shown in the figure) into the data lines S, and the process of writing the data signal into the data lines S by the demultiplexing circuit 20 may include that the plurality of clock signal lines CKH of the demultiplexing circuit 20 are turned on in sequence and the data signals are sequentially written into the plurality of data lines S, such that each data line S has data signals.

The threshold compensation of the driving transistor DT in this embodiment may be realized by the first voltage signal provided by the first power supply signal terminal PVDD, and may not require the participation of the data signals. Therefore, while the driving transistor DT performs the threshold value compensation, the multiplexing circuit 20 may write the data signal into the data line S. The threshold compensation of the driving transistor DT and the writing of the data signal to the data line of the demultiplexing circuit 20 may not need to be performed in sequence, but may be performed simultaneously, which may be beneficial to increase the time for threshold compensation. The driving transistor DT may be sufficiently compensated. Therefore, when the driving circuit 00 of this embodiment is applied to a display panel, the phenomenon of uneven display may be avoided, which may be beneficial to improve the uniformity of display brightness and the display effect. Further, the demultiplexing circuit 20 can adopt the structure of as many clock signal lines as possible, and when the driving circuit 00 of this embodiment is applied to the display panel, it is beneficial to realize the narrow frame of the display panel while ensuring the display effect. Further, the demultiplexing circuit 20 may adopt a structure with as many clock signal lines as possible. When the driving circuit 00 of this embodiment is applied to the display panel, it may be beneficial to realize a narrow frame of the display panel while ensuring the display effect.

Further, during the threshold compensation of the driving transistor DT, there may be no need to form a path between the first power supply signal terminal PVDD and the second power supply signal terminal PVEE. Therefore, the control terminal of the second light-emitting control module 103 may be configured to respond to the second power supply signal terminal of the pixel circuit 10 to be turned off. That is, the second light-emitting control module 103 may be turned off to prevent the residual charge (the charge may be the residual charge in the storage module 106) from flowing by leakage to the anode of the light-emitting device EL through the path between the high potential of the first power signal terminal PVDD and the low potential of the second power signal terminal PVEE. When the residual charge flows to the anode of the light-emitting device EL through the path between the high potential of the first power signal terminal PVDD and the low potential of the second power signal terminal PVEE, the light-emitting device EL may be prone to residual charge, resulting in that the brightness of the light-emitting device EL is not dark enough in the dark state, and the dark-state display effect of the light-emitting device EL may be poor. The threshold compensation of this embodiment may not require the formation of a path between the first power signal terminal PVDD and the second power signal terminal PVEE, and the potential of the second node N2 may still drop to the required potential value. Therefore, the second light-emitting control module 103 may be turned off, that is, the path flowing to the light-emitting device EL may be closed, such that the residual charge cannot be transferred to the light-emitting device EL, and the light-emitting device EL may meet the standard brightness in the dark state. The display effect in the dark state may be improved.

The embodiment where the pixel circuit 10 includes the structure shown in FIG. 13 is used as an example to illustrate the present disclosure, and does not limit the scope of the present disclosure. In some other embodiments, the frame structure of the pixel circuit 10 may include other module structures capable of driving the light-emitting device EL to emit light, which may refer to the structures of the pixel circuit in the existing technologies.

Figure 14:
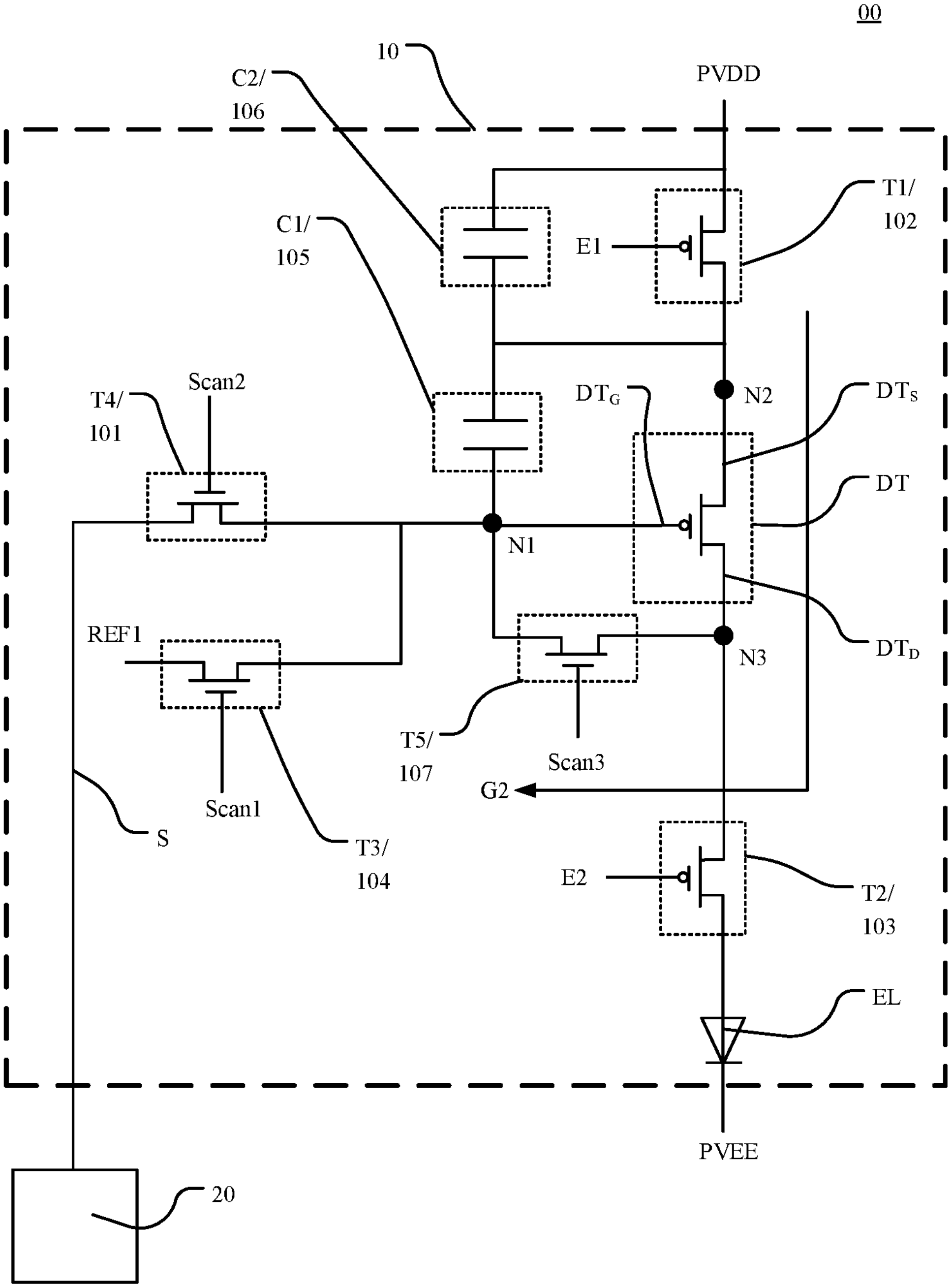
FIG. 14 illustrates a connection structure of a specific circuit of the driving circuit in FIG. 13.
Figure 15:
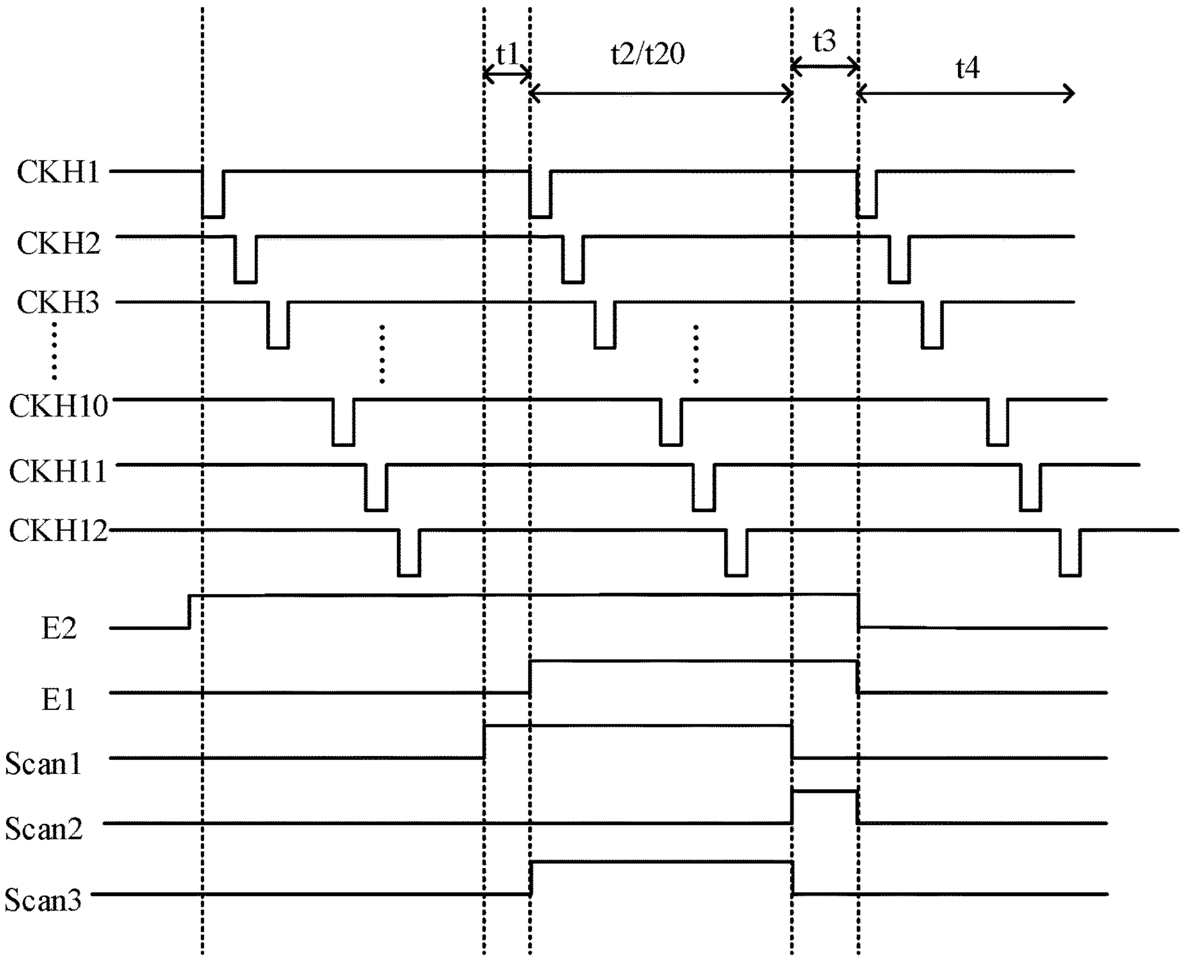
FIG. 15 illustrates a timing diagram of operation of the driving circuit in FIG. 14.

In one embodiment shown in FIG. 13, FIG. 14 which is a circuit connection structure of the driving circuit in FIG. 13, and FIG. 15 which is a timing diagram of the driving circuit in FIG. 14, the brightness adjustment module 107 may include a fifth transistor T5 and a third scan signal terminal Scan3. The third scan signal terminal Scan3 may receive a third scan signal. A gate of the fifth transistor T5 may be connected to the third scan signal terminal Scan3, a source of the fifth transistor T5 may be connected to the gate $DT_G$ of the driving transistor DT, and a drain of the fifth transistor T5 may be connected to the drain $DT_D$ of the drive transistor DT.

The embodiment where the fifth transistor T5 is an N-type transistor is used as an example to illustrate the present disclosure, and does not limit the scopes of the present disclosure. In some other embodiments, the fifth transistor T5 may be a P-type transistor. When the fifth transistor T5 is a P-type transistor, the P-type transistor is turned on when its gate is at a low potential. When the fifth transistor T5 is an N-type transistor, the N-type transistor is turned on when its gate is at a high potential. That is, to realize the conduction of the transistor, the signals provided by the third scan signal terminal Scan3 to the fifth transistor T5 of different types are opposite.

In one embodiment, when the driving circuit 00 operates, as shown in FIG. 14 and FIG. 15, the demultiplexing circuit 20 may include 12 clock signal lines CKH, that is, the demultiplexing circuit 20 may adopt a demux 1:12 structure. The process of charging the data line S in the display panel with the data signal by the demultiplexing circuit 20 of this structure may be performed simultaneously with the threshold compensation of the driving transistor DT in the pixel circuit 10.

In the reset stage t1, the first scan signal at the first scan signal terminal Scan1 may be at a high level, the second scan signal of the second scan signal terminals Scan2 may be at a low level, the first light-emitting signal at the first light-emitting signal terminal E1 may be at a low level, and the second light-emitting signal at the second light-emitting signal terminal E2 may be at a high level. Correspondingly, the first transistor T1 of the first light-emitting control module 102 and the third transistor T3 of the first reset module 104 may be turned on, the second transistor T2 of the second light-emitting control module 103, the fourth transistor T4 of the data writing module 101, and the fifth transistor T5 of the brightness adjustment module 107 may be turned off. The first reset signal of the first reset signal terminal REF1 may be transmitted to the first node N1, that is, the first reset signal of the first reset signal terminal REF1 may be transmitted to the gate $DT_G$ of the driving transistor DT. The first reset signal may use its low level to reset the gate $DT_G$ of the driving transistor DT, that is, the gate $DT_G$ of the driving transistor DT may be at a low level at this time to make the driving transistor DT be turned on. The first voltage signal of the first power supply signal terminal PVDD may be transmitted to the second node N2, that is, the first voltage signal of the first power supply signal terminal PVDD may be transmitted to the source $DT_S$ of the driving transistor DT. That is, N1=Vref1, N2=Vpvdd.

Then in the threshold compensation stage t2, the first scan signal at the first scan signal terminal Scan1 may be still at a high level, the second scan signal at the second scan signal terminal Scan2 may be still at a low level, the first light-emitting signal at the first light-emitting signal terminal E1 may change to a high level, and the second light-emitting signal of the second light-emitting signal terminal E2 may become a low level. Correspondingly, the fifth transistor T5 of the brightness adjustment module 107 and the third transistor T3 of the first reset module 104 may be turned on, and the second transistor T2 of the second light-emitting control module 103, the first transistor T1 of the first light-emitting control module 102, and the fourth transistor T4 of the data writing module 101 may be turned off. Since the low level of the first reset signal makes the driving transistor DT be turned on, when the first transistor T1 is turned off and the second transistor is turned on, the level of the second node N2 may gradually decrease from the first voltage signal VPcdd. Further, since the first transistor T1 of the first light-emitting control module 102 is turned off, the charge stored in the second capacitor C2 of the storage module 106 may leak, further reducing the potential of the second node N2. Since the third transistor T3 is turned on, during decreasing the level of the second node N2, the level of the first node N1 may remain at the first reset signal Vref1 of the first reset signal terminal REF1. Correspondingly, when the level of the second node N2 may drop to the point where the level difference between the first node N1 and the second node N2 is the threshold voltage Vth of the driving transistor DT. That is, N1=Vref1, N2=N1+|Vth|=Vref1+|Vth|. The driving transistor DT may be turned off, and the threshold compensation of the threshold compensation stage t2 may be completed. During the threshold compensation of the driving transistor DT, the second transistor T2 of the second light-emitting control module 103 may be turned off, and the path between the first power signal terminal PVDD and the second power signal terminal PVEE may not formed. Therefore, the path flowing to the light-emitting device EL may be closed, such that the residual charge cannot be transferred to the light-emitting device EL, and the light-emitting device EL may meet the standard brightness in the dark state. The display effect in the dark state may be improved.

Further, because the threshold compensation process of the driving transistor DT in the threshold compensation stage t2 is realized by cooperation between the first voltage signal Vpcdd provided by the first power signal terminal PVDD and the brightness adjustment module 107, the fourth transistor T4 of the data writing module 101 may be always in the off state during this process, that is, no data signal may be required. Therefore, while the threshold compensation is performed by the drive transistor DT in the threshold compensation stage t2, the data signal charging stage t20 may also be completed through the demultiplexing circuit 20, that is, the operating time of the threshold compensation stage t2 and the data signal charging stage t20 may overlap. When the demultiplexing circuit 20 completes the data signal charging stage t20, the 12 clock signal lines CKH of the demultiplexing circuit 20 may be turned on sequentially to turn on the demultiplexing circuit 20, such that the data signals provided by the driving IC (not shown in the figure) are sequentially written to each data line S and each data line S has a data signal.

In the data writing stage t3, the first scan signal of the first scan signal terminal Scan1 may become a low level, the second scan signal of the second scan signal terminal Scan2 may become a high level, the first light-emitting signal of the first light-emitting signal terminal E1 may still be at a high level, and the second light-emitting signal of the second light-emitting signal terminal E2 may be still at a low level. Therefore, the second transistor T2 of the second light-emitting control module 103 and the fourth transistor T4 of the data writing module 101 may be turned on, and the first transistor T1 of the first light-emitting control module 102, the third transistor T3 of the first reset module 104, and the fifth transistor T5 of the brightness adjustment module 107 may be turned off. The data signal Vdata on the data line S may be transmitted to the first node N1 through the fourth transistor T4, that is, N1=Vdata. Because of the coupling effect of the first capacitor C1 in the coupling module 105, the potential change of the first node N1 may be synchronously coupled to the second node N2 (that is, the source $DT_S$ of the driving transistor DT), such that the potential of the second node N2 is N2=(current N1−original N1)×C1/(C1+C2)+original N2=(Vdata−Vref1) C1/(C1+C2)+Vref1+|Vth|. The potential of the second node N2 may change following the potential change of the first node N, such that the driving transistor DT is kept turned on and is ready to be turned on for the subsequent realization of the light-emitting purpose.

In the light-emitting stage t4, the first scan signal of the first scan signal terminal Scan1 may be still at a low level, the second scan signal of the second scan signal terminal Scan2 may become a low level, and the first light-emitting signal of the first light-emitting signal terminal E1 may become a low level, the second light-emitting signal of the second light-emitting signal terminal E2 may be still at low level. Therefore, the first transistor T1 of the first light-emitting control module 102 and the second transistor T2 of the second light-emitting control module 103 may be turned on, and the fourth transistor T4 of the data writing module 101, the third transistor T3 of the first reset module 104, and the fifth transistor T5 of the brightness adjustment module 107 may be in the off state. The first voltage signal Vpvdd of the first power signal terminal PVDD may be transmitted to the second node N2, and the potential of the second node N2 may become N2=Vpvdd. The voltage variation of the second node ΔN2=Vpvdd−[(Vdata−Vref1)×C1/(C1+C2)+Vref1+|Vth|] may be calculated. Because the coupling effect of the first capacitor C1 of the coupling module 105, the potential of the first node N1 may also change, and become N1=Vdata+Vpvdd−[(Vdata−Vref1)×C1/(C1+C2)+Vref1+|Vth|]. The light-emitting current of the light-emitting device may be EL Id=k×(Vgs−|Vth|)2, Vgs=N2−N1, such that N2−N1−|Vth|=Vpvdd−Vdata−Vpvdd+[(Vdata−Vref1)×C1/(C1+C2)+Vref1+|Vth|]−|Vth|=(Vdata−Vref1)×C1/(C1+C2)+Vref1−Vdata=(Vref1−Vdata)×[1−C1/(C1+C2)]=C2/(C1+C2)×(Vref1−Vdata), the light-emitting current Id of the light-emitting device EL may be Id=k×(N2−N1−|Vth|)2=k×[C2/(C1+C2)×(Vref1−Vdata)]2=k'×(Vref1−Vdata)2, where k'=k×C22/(C1+C2)2, the constant k is related to the performance of the driving transistor DT itself, and k' is a new constant. The driving transistor DT may generate the above-mentioned light-emitting current, to drive the light-emitting device EL to emit light.

For description purposes only, the present embodiment uses the connection structure of the driving circuit in FIG. 14 as an example to illustrate the operation stage of the driving circuit provided by the present disclosure, and does not limit the scope of the present disclosure. In various embodiments, the operation process of the driving circuit may further include other suitable stages.

Figure 16:
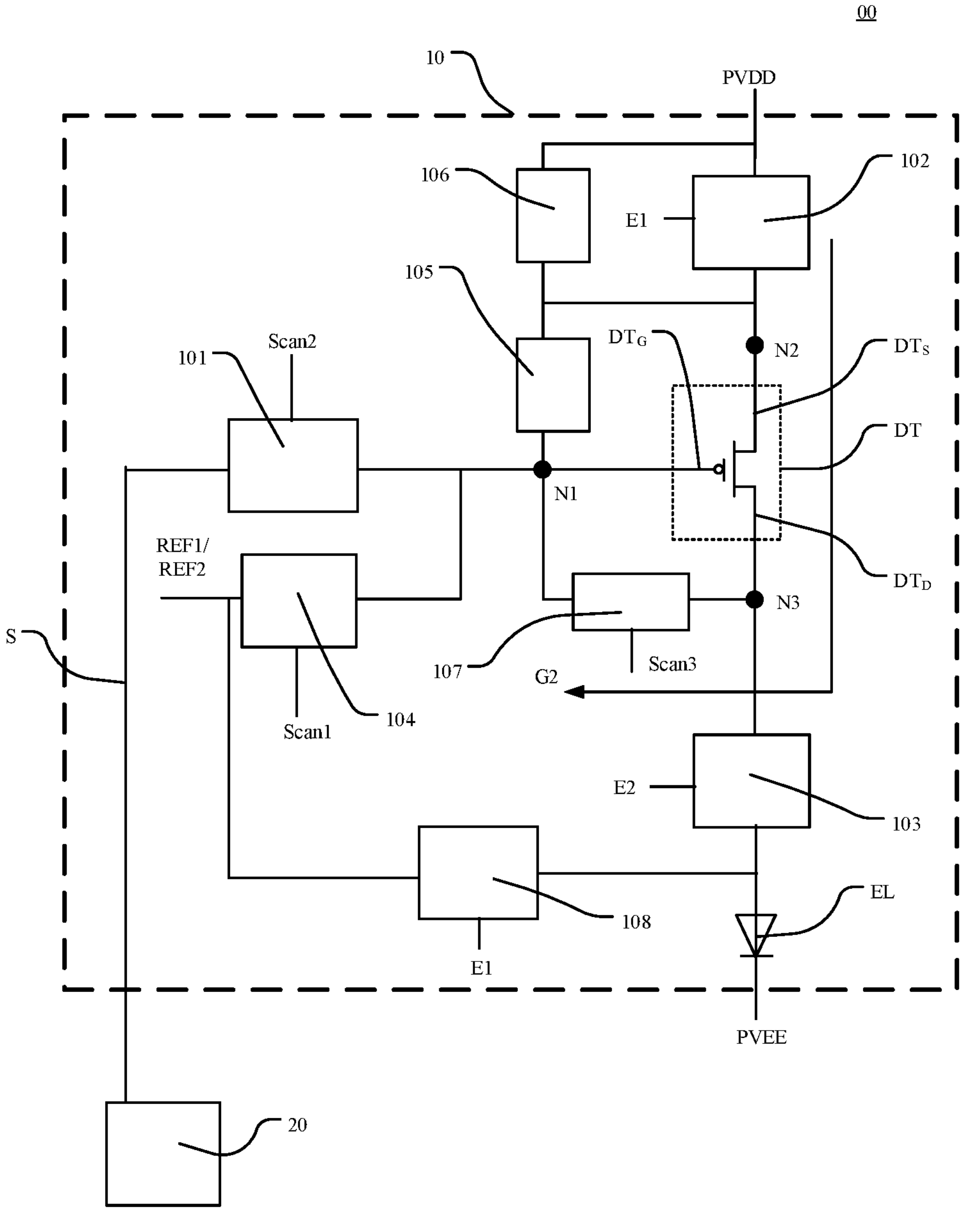
FIG. 16 illustrates another exemplary frame connection structure of a driving circuit consistent with various disclosed embodiments in the present disclosure.

In another embodiment shown in FIG. 16 which is the frame connection structure of another driving circuit, the pixel circuit 10 may include a first light-emitting control module 102, a second light-emitting control module 103, a brightness adjustment module 107, a first reset module 104, and a second reset module 108. An input terminal of the second reset module 108 may be connected to the second reset signal terminal REF2, and the second reset signal terminal REF2 may receive the second reset signal Vref2. An output terminal of the second reset module 108 may be connected to the anode of the light-emitting device EL, and the second reset signal terminal REF2 may be configured to reset the anode of the light-emitting device EL.

The pixel circuit 10 may further include the second reset module 108. The input terminal of the second reset module 108 may be connected to the second reset signal terminal REF2, and the output terminal of the second reset module 108 may be connected to the anode of the light-emitting device EL. Optionally, the second reset module 108 may further include a control terminal, and the control terminal may be configured to receive the second reset enable signal. The second reset enable signal may be the first light-emitting signal, that is, the control terminal of the second reset module 108 may be connected to the first light-emitting signal terminal E1. When the control terminal of the second reset module 108 is turned on in response to the first light-emitting signal of the first light-emitting signal terminal E1, the second reset signal Vref2 of the second reset signal terminal REF2 may be transmitted to the anode of the light-emitting device EL. The anode of the light-emitting device EL may be reset to initialize the anode of the light-emitting device EL, thereby improving the residual of the previous frame of data signal, improving the afterimage phenomenon, and improving the display effect when the driving circuit 00 is applied to the display panel.

As shown in FIG. 16, in one embodiment, the second reset signal terminal REF2 may be connected to the first reset signal terminal REF1, that is, the input terminal of the first reset module 104 and the input terminal of the second reset module 108 may be connected together to provide the same first reset signal Vref1 and the second reset signal Vref2. In some other embodiments, the second reset signal terminal REF2 and the first reset signal terminal REF1 may be independent of each other, that is, the first reset signal Vref1 and the second reset signal Vref2 may different (this embodiment is not shown in the drawings). The implementation may be configured according to actual needs and is not limited in this embodiment.

Figure 17:
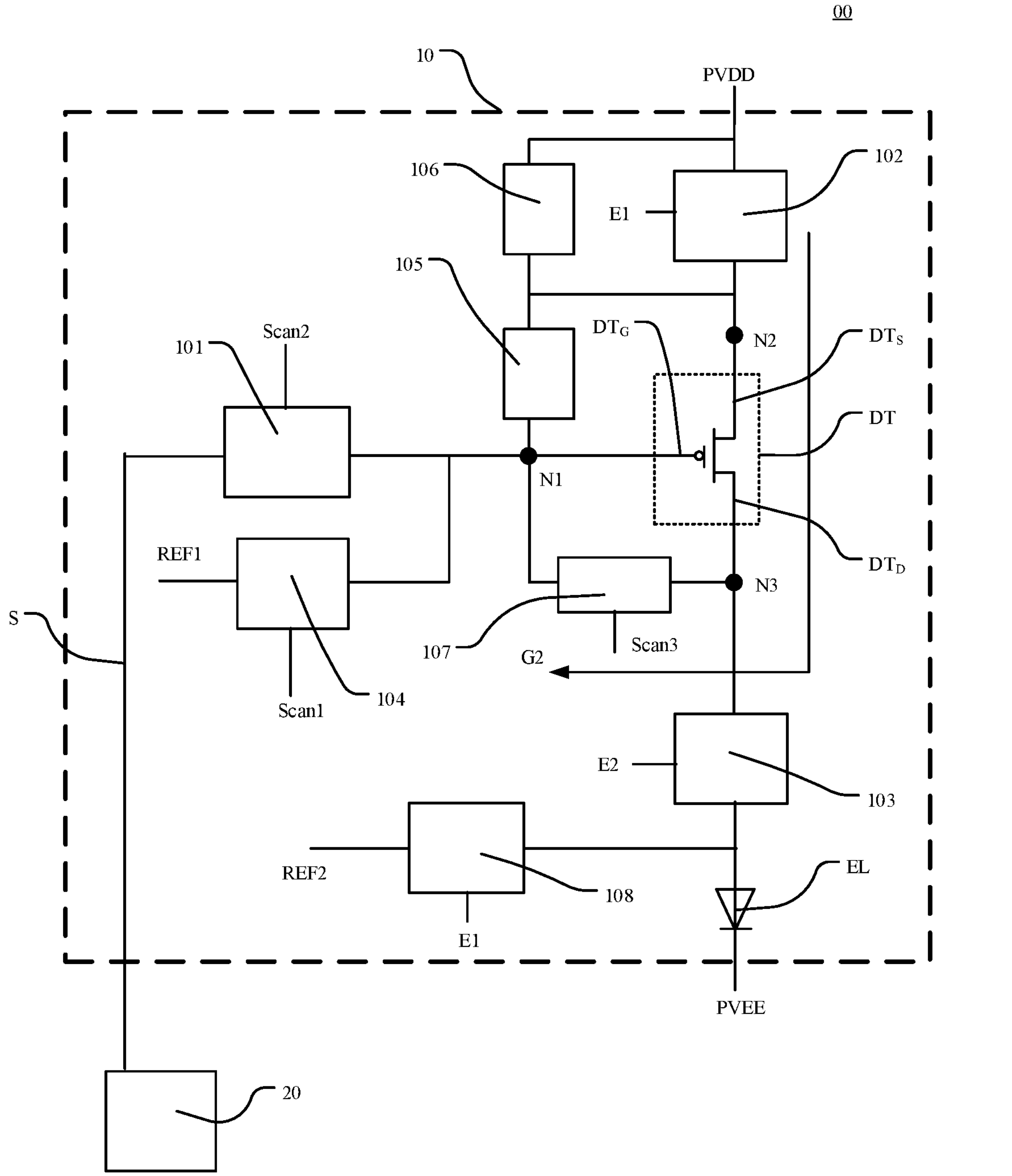
FIG. 17 illustrates another exemplary frame connection structure of a driving circuit consistent with various disclosed embodiments in the present disclosure.

In another embodiment shown in FIG. 11 and FIG. 17 which is the frame connection structure of another driving circuit and whose timing diagrams of the first reset signal Vref1 and the second reset signal Vref2 are shown in FIG. 11, the pixel circuit 10 may include a first light-emitting control module 102, a second light-emitting control module 103, a first reset module 104, and a second reset module 108. An input terminal of the second reset module 108 may be connected to the second reset signal terminal REF2, and the second reset signal terminal REF2 may receive the second reset signal Vref2. An output terminal of the second reset module 108 may be connected to the anode of the light-emitting device EL, and the second reset signal terminal REF2 may be configured to reset the anode of the light-emitting device EL. Values of the first reset signal Vref1 and the second reset signal Vref2 may be different.

The pixel circuit 10 may include the first reset module 104 and the second reset module 108. The input terminal of the first reset module 104 may be connected to the first reset signal terminal REF1. The first reset signal terminal REF1 may receive the first reset signal and is configured to provide the first reset signal Vref1 for the pixel circuit 10. The output terminal of the first reset module 104 may be connected to the gate $DT_G$ of the driving transistor DT, and the first reset signal terminal REF1 may reset the gate $DT_G$ of the driving transistor DT through the received first reset signal Vref1. Thus, the driving transistor DT may be turned on during the threshold compensation. The input terminal of the second reset module 108 may be connected to the second reset signal terminal REF2, and the output terminal of the second reset module 108 may be connected to the anode of the light-emitting device EL. The second reset signal Vref2 of the second reset signal terminal REF2 may be transmitted to the anode of the light-emitting device EL. The anode of the light-emitting device EL may be reset to initialize the anode of the light-emitting device EL, thereby improving the residual of the previous frame of data signal, improving the afterimage phenomenon, and improving the display effect when the driving circuit 00 is applied to the display panel. In the reset stage of the pixel circuit 10, the first reset module 104 and the second reset module 108 may reduce the residual of the previous frame of data signal, therefore improving the afterimage phenomenon and being beneficial to the conduction of the driving transistor DT in the threshold compensation.

The value of the first reset signal Vref1 in this embodiment may be different from the value of the second reset signal Vref2. That is, when the driving circuit 00 of this embodiment is applied to the display panel, the first reset signal terminal REF1 and the second reset signal terminal REF2 may be electrically connected to different reset signal lines, such that the first reset module 104 and the second reset module 108 use different reset signals to reset the gate $DT_G$ of the driving transistor DT and the anode of the light-emitting device EL. Optionally, the value of the first reset signal Vref1 may be greater than the value of the second reset signal Vref2. As shown in FIG. 11, when the first reset signal Vref1 is a square wave signal, the first reset signal Vref1 includes a low level V1L and a high level V1H. The low potential V1L of the first reset signal Vref1 may be greater than the potential V2 of the second reset signal Vref2. If the potential of the first reset signal Vref1 is too low, when the data writing module 101 in the data writing stage writes the fixed data signal into the gate $DT_G$ of the driving transistor DT, the first reset signal Vref1 may pull down the original potential of the gate $DT_G$ of the driving transistor DT to a very low level, and the gate $DT_G$ of the driving transistor DT may be not fully charged. The potential value of the second reset signal Vref2 may be expected to be lower, to reset the anode of the light-emitting device EL more thoroughly, and avoid the occurrence of sub-pixel stealth caused by lateral leakage current between the light-emitting devices EL of adjacent sub-pixels.

As shown in FIG. 10 and FIG. 12 which is a circuit structure of the driving circuit in FIG. 10, the second reset module 108 may include a sixth transistor T6. A gate of the sixth transistor T6 may be connected to the first light-emitting signal terminal E1, a source of the sixth transistor T6 may be connected to the second reset signal terminal REF2, and the second reset signal terminal REF2 may be independent from the first reset signal terminal REF1. A drain of the sixth transistor T6 may be connected to the anode of the light-emitting device EL.

In the present embodiment, the second reset signal terminal REF2 and the first reset signal terminal REF1 may be set to be independent of each other, and the value of the first reset signal Vref1 may be different from the value of the second reset signal Vref2. When the second reset signal Vref2 needs to be pulled down to improve the occurrence of sub-pixel stealth of the light-emitting device, the low level of the first reset signal Vref1 may not need to be pulled down as the second reset signal Vref2 is pulled down, such that the low level V1L of the first reset signal Vref1 could be higher than the potential V2 of the second reset signal Vref2 after being pulled down. The data signal may be written based on a slightly higher low potential V1L when the data signal is written into the gate $DT_G$ of the driving transistor DT after the gate $DT_G$ of the driving transistor DT is reset. Therefore, the voltage difference between the initial potential of the gate $DT_G$ of the driving transistor DT and the data signal to be written may be reduced, such that the data signal could be written more fully in the data writing stage.

It can be understood that this embodiment does not specifically limit the types of the first reset signal Vref1 and the second reset signal Vref2. The first reset signal Vref1 and the second reset signal Vref2 may both be DC signals; or the first reset signal Vref1 may be a square wave AC signal and the second reset signal Vref2 may be a DC signal; or the first reset signal Vref1 and the second reset signal Vref2 may also be other types of signals, as long as the value of the first reset signal Vref1 is greater than that of the second reset signal Vref2. The present disclosure has no limit on this.

Figure 18:
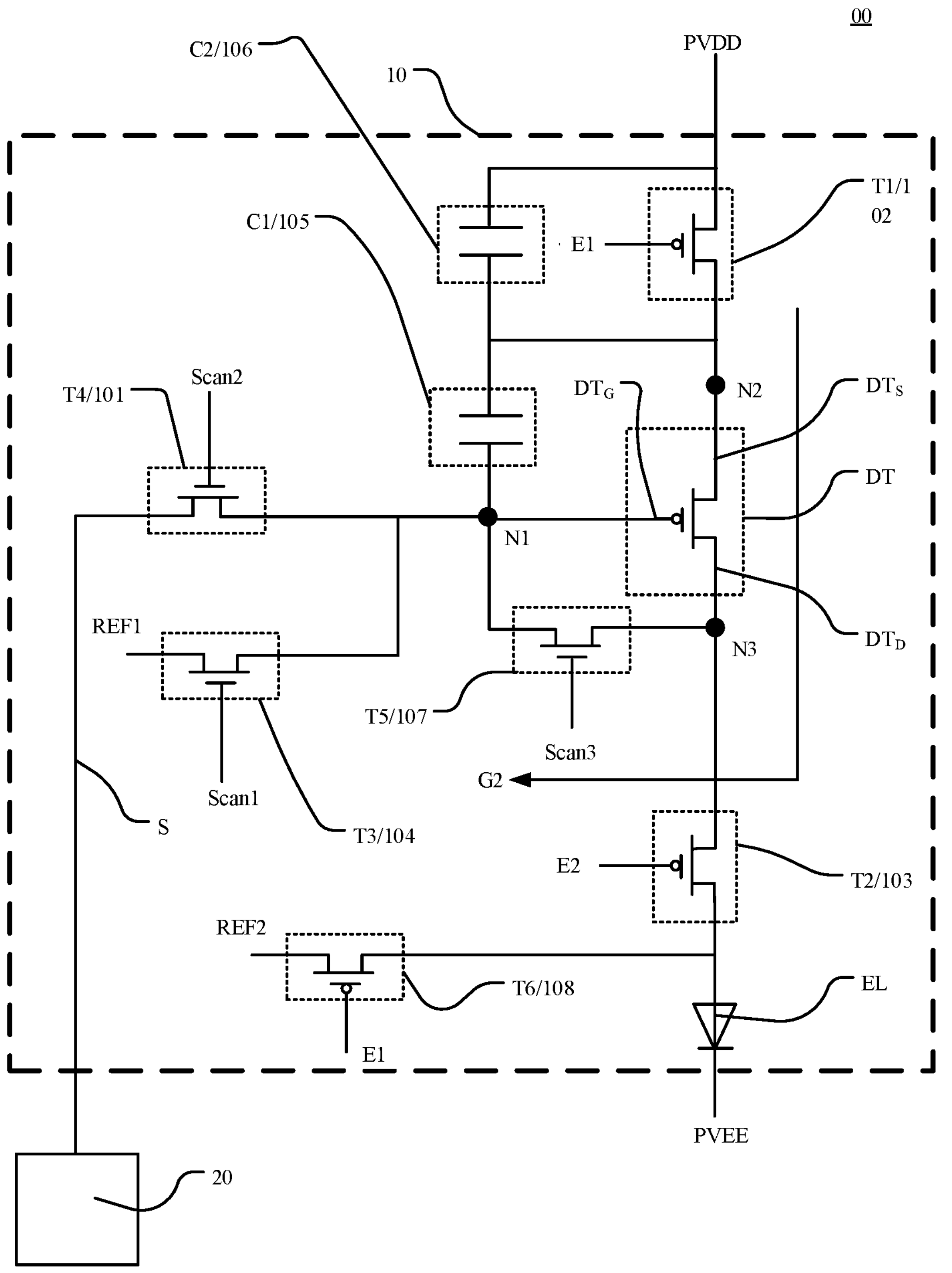
FIG. 18 illustrates a connection structure of a specific circuit of the driving circuit in FIG. 17.

As shown in FIG. 15, FIG. 17 and FIG. 18 which is a circuit structure of the driving circuit in FIG. 17, the second reset module 108 may include a sixth transistor T6. A gate of the sixth transistor T6 may be connected to the first light-emitting signal terminal E1, a source of the sixth transistor T6 may be connected to the second reset signal terminal REF2, and a drain of the sixth transistor T6 may be connected to the anode of the light-emitting device EL.

The embodiment where the sixth transistor T6 is a P-type transistor is used as an example to illustrate the present disclosure, and does not limit the scopes of the present disclosure. In some other embodiments, the sixth transistor T6 may be an N-type transistor. When the sixth transistor T6 is a P-type transistor, the P-type transistor is turned on when its gate is at a low potential. When the sixth transistor T6 an N-type transistor, the N-type transistor is turned on when its gate is at a high potential. That is, to realize the conduction of the transistor, the signals provided by the first light-emitting signal terminal E1 to the sixth transistor T6 of different types are opposite.

In the reset stage t1, as shown in FIG. 15 and FIG. 18, the first scan signal at the first scan signal terminal Scan1 may be at a high level, the second scan signal of the second scan signal terminals Scan2 may be at a low level, the third scan signal of the third scan signal terminals Scan3 may be at a low level, the first light-emitting signal at the first light-emitting signal terminal E1 may be at a low level, and the second light-emitting signal at the second light-emitting signal terminal E2 may be at a high level. Correspondingly, the first transistor T1 of the first light-emitting control module 102, the third transistor T3 of the first reset module 104, and the sixth transistor T6 of the second reset module may be turned on, the second transistor T2 of the second light-emitting control module 103, the fourth transistor T4 of the data writing module 101, and the fifth transistor T5 of the brightness adjustment module 107 may be turned off. The first reset signal of the first reset signal terminal REF1 may be transmitted to the first node N1, that is, the first reset signal of the first reset signal terminal REF1 may be transmitted to the gate $DT_G$ of the driving transistor DT. The first reset signal may use its low level to reset the gate $DT_G$ of the driving transistor DT, that is, the gate $DT_G$ of the driving transistor DT may be at a low level at this time to make the driving transistor DT be turned on. The first voltage signal of the first power supply signal terminal PVDD may be transmitted to the second node N2, that is, the first voltage signal of the first power supply signal terminal PVDD may be transmitted to the source $DT_S$ of the driving transistor DT. That is, N1=Vref1, N2=Vpvdd. The second reset signal Vref2 of the second reset signal terminal REF2 may be transmitted to the anode of the light-emitting device EL, and the anode of the light-emitting device EL may be reset, such that the anode of the light-emitting device EL may be initialized. Therefore, the residual of the data signal of the previous frame may be improved to reduce the afterimage phenomenon.

In some embodiments shown in FIG. 1 to FIG. 18 and FIG. 19 which is a frame connection structure of a demultiplexing circuit 20, the demultiplexing circuit 20 may include a plurality of demultiplexing units 201. Each demultiplexing unit 201 may include a plurality of control terminals 201A, an input terminal 201B, and a plurality of output terminals 201C. Each of the plurality of control terminals 201A may be connected to a clock signal terminal CKH, and the clock signal terminal CKH may receive the clock control signal Vckh. The input terminal 201B may receive the data signal Vdata, and each of the plurality of output terminals 201C may be respectively connected to a corresponding data line S.

Figure 19:
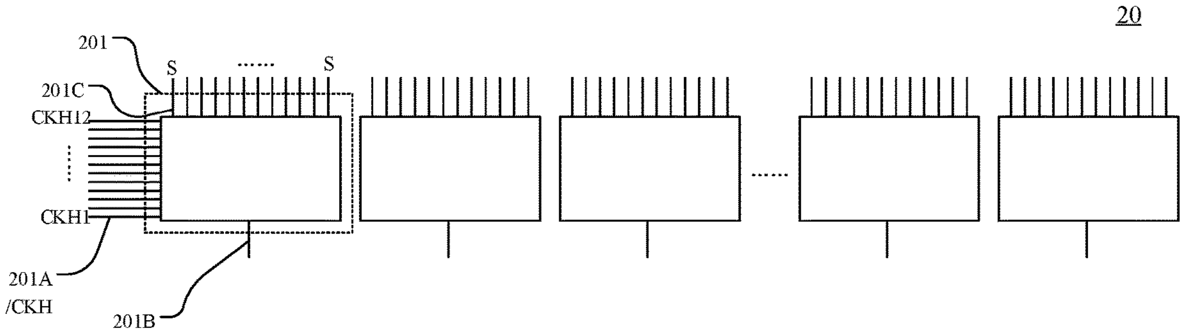
FIG. 19 illustrates a frame connection structure of an exemplary multiplexer circuit consistent with various disclosed embodiments in the present disclosure.

In the present embodiment, the demultiplexing circuit 20 may include a plurality of demultiplexing units 201. Each demultiplexing unit 201 may include a plurality of control terminals 201A, an input terminal 201B, and a plurality of output terminals 201C. A signal may be decomposed into multiple signal channels by a corresponding one of the plurality of demultiplexing unit 201. For example, a demultiplexing unit 201 of the plurality of demultiplexing unit 201 may include 6 output terminals 201C, and a signal may be decomposed into 6 signal channels (not shown in the drawings). Another demultiplexing unit 201 of the plurality of demultiplexing unit 201 may include 12 output terminals 201C, then a signal may be decomposed into 12 signal channels (as shown in FIG. 19, the number of clock signal terminals CKH and the plurality of output terminals 201C are both 12, and the input signal of the 12 clock signal terminals CKH may be shown as CKH1-CKH12 in FIG. 5 and FIG. 15). The plurality of control terminals 201A in this embodiment may be connected to different clock signal terminals CKH, and the clock control signal Vckh received by the clock signal terminals CKH may be configured to turn on or off the plurality of demultiplexing unit 201. When being applied to the display panel, the clock signal terminals CKH may be connected to the clock control signal lines in the display panel, that is, the clock control signal Vckh may be provided by the clock control signal lines in the display panel. The number of clock signal terminals CKH included in one of the demultiplexing unit 201 may be the same as the number of the plurality of output terminals 201C, and each of the clock signal terminals CKH may be configured to respond to the clock control signal Vckh to connect a corresponding one of the plurality of input terminal 201B with a corresponding one of the plurality of output terminals 201C, such that the data signal Vdata is output to the data line S corresponding to the corresponding one of the plurality of output terminals 201C.

Figure 20:
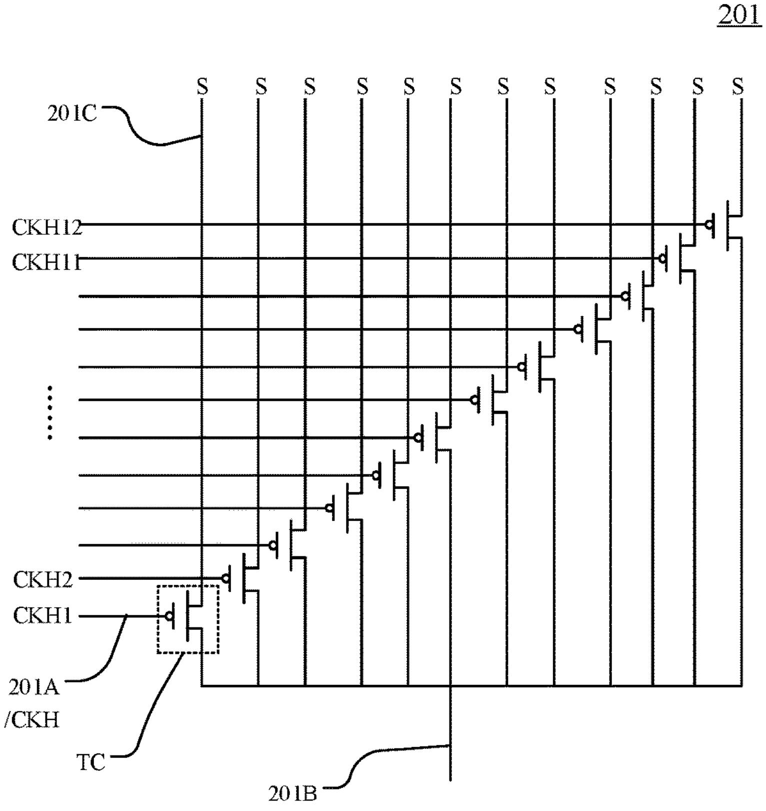
FIG. 20 illustrates a specific connection of a multiplexer unit in the multiplexer circuit in FIG. 19.

As shown in FIG. 19 and FIG. 20 which is a circuit connection structure of one demultiplexing unit of the plurality of demultiplexing units in the demultiplexing circuit shown in FIG. 19, the demultiplexing unit 201 may include a plurality of clock control transistors TC. The number of the plurality of clock control transistors TC may be the same as that of the plurality of output terminals 201C. A gate of one clock control transistor TC of the plurality of clock control transistors TC may be used as a corresponding control terminal 201A to connect to a corresponding clock signal terminal CKH, a source of one clock control transistor TC of the plurality of clock control transistors TC may be used as a corresponding output terminal 201C to connect to a corresponding data line S, and drains of the plurality of clock control transistors TC may be connected together and used as the input terminal 201B of the demultiplexing unit 201.

The embodiment in FIG. 20 where each of the plurality of clock control transistors TC is a P-type transistor is used as an example for illustration, and does not limit the scope of the present disclosure. In some other optional embodiments, each of the plurality of clock control transistors TC may also be an N-type transistor. When the clock control transistor TC is a P-type transistor, the P-type transistor may be turned on when its gate is at a low potential (in the embodiments shown in FIG. 5 and FIG. 15, when the clock control signal Vckh provided by the corresponding clock signal terminal CKH is at a low potential, the clock control transistor TC is turned on). When the clock control transistor TC is an N-type transistor, the N-type transistor is turned on when its gate is at a high potential. To turn on the transistor, the signal provided by the clock signal terminal CKH to different types of the control transistor TC may be opposite.

In the demultiplexing unit 201 shown in FIG. 19 and FIG. 20, a ratio of the number of the plurality of the input terminals 201B and the number of the plurality of output terminals 201C may be 1:12. The embodiment shown in FIG. 19 and FIG. 20 is used as an example to illustrate the present disclosure and does not limit the scope of the present disclosure. In various embodiments, the ratio of the number of the plurality of the input terminals 201B and the number of the plurality of output terminals 201C may be any suitable value, as long as the ratio of the number of the plurality of the input terminals 201B and the number of the plurality of output terminals 201C meets 1:N where N≥6. Therefore, when the demultiplexing circuit 20 writes the data signal into the data line S, the driving transistor DT of the pixel circuit 10 performs threshold compensation to increase the time for threshold compensation, such that the driving transistor DT may be fully compensated. When the driving circuit 00 is applied to a display panel, the uniformity of display brightness and the display effect may be improved. Further, by setting the ratio of the number of the plurality of the input terminals 201B and the number of the plurality of output terminals 201C to be less than or equal to 1:6 such that the one input signal of one of the plurality of demultiplexing units 201 is decomposed into more output signal channels, the frame space occupied by the demultiplexing circuit 20 may be reduced, which is beneficial to realize a narrower frame.

Figure 21:
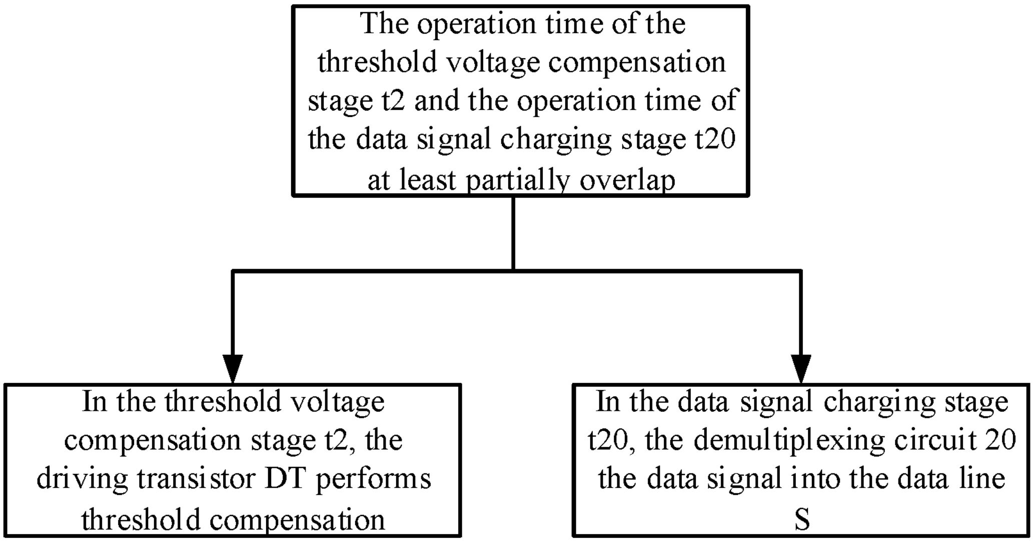
FIG. 21 illustrates an exemplary driving method consistent with various disclosed embodiments in the present disclosure.
Figure 22:
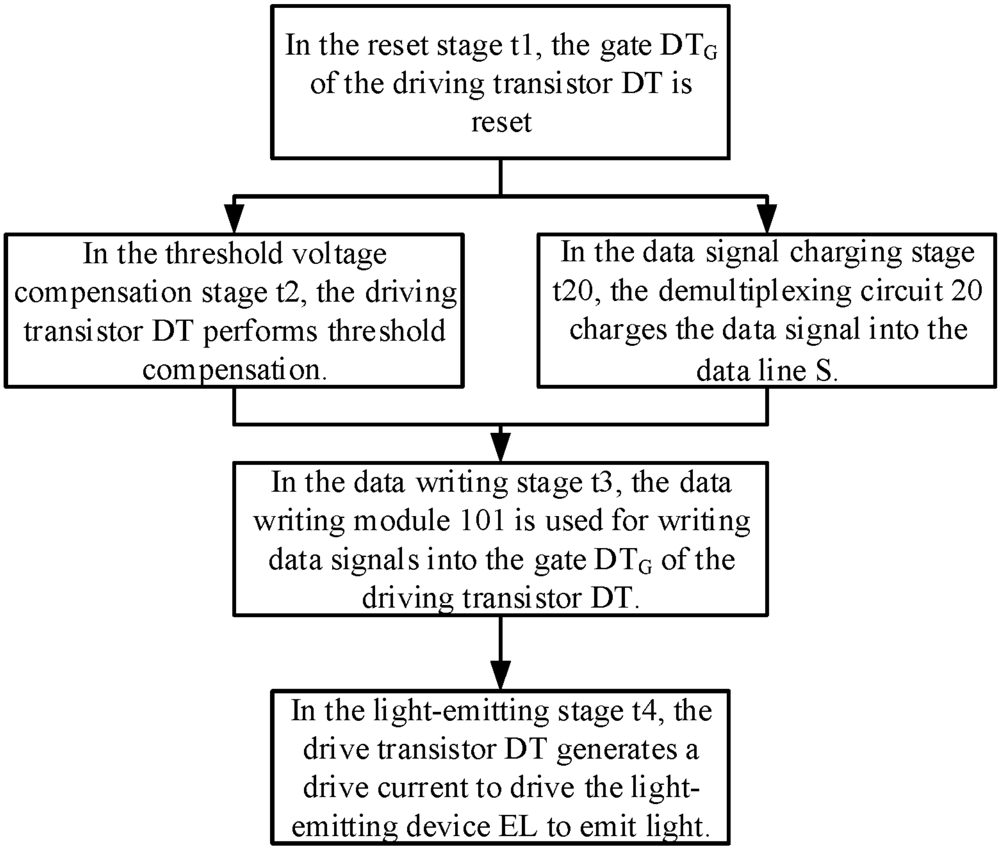
FIG. 22 illustrates another exemplary driving method consistent with various disclosed embodiments in the present disclosure.

One embodiment shown in FIG. 21 of the present disclosure provides a driving method of a driving circuit. As shown in FIG. 21, the driving method may be configured to drive the driving circuit in FIG. 1 to work.

The driving method may include at least two working stages including a threshold voltage compensation stage t2 and a data signal charging stage t20. In the threshold voltage compensation stage t2, the driving transistor DT may perform threshold compensation. In the data signal charging stage t20, the demultiplexing circuit 20 may write the data signal into the data line S.

The operation time of the threshold voltage compensation stage t2 and the operation time of the data signal charging stage t20 may at least partially overlap.

In the present embodiment, the driving method of the driving circuit may be configured to perform the driving operation to the driving circuit 20 in the above-mentioned embodiment, such that when the driving circuit 00 is applied to a display panel, it may drive the display panel to display a picture. The working process of the driving method may include at least two working stages, namely, the threshold voltage compensation stage t2 and the data signal charging stage t20. In the threshold voltage compensation stage t2, the driving transistor DT may perform threshold compensation. In the data signal charging stage t20, the demultiplexing circuit 20 may write the data signal into the data line S. The operation time of the threshold voltage compensation stage t2 and the operation time of the data signal charging stage t20 may at least partially overlap. That is, the demultiplexing circuit 20 may perform writing of the data signal to the data line S in the working stage of the threshold voltage compensation of the driving transistor DT in the pixel circuit 10. By setting the operation time of the two working stages at least partially overlap, the time of the threshold voltage compensation stage t2 may be increased, such that the driving transistor DT may be fully compensated. Therefore, when the driving circuit 00 is applied to the display panel, the phenomenon of uneven display may be avoided, which is beneficial to improve the uniformity of display brightness and the display effect. And because the working time of the threshold voltage compensation stage t2 and the working time of the data signal charging stage t20 in this embodiment at least partially overlap, that is, the work of the threshold voltage compensation stage t2 and the work of the data signal charging stage t20 do not need to be performed sequentially. Therefore, the demultiplexing circuit 20 may be structured with as many clock signal lines as possible. When the driving circuit 00 of this embodiment is applied to the display panel, it may be beneficial to realize the narrow frame of the display panel while ensuring the display effect.

It should be understood that the driving method of the present disclosure may include but is not limited to the above stages, and may further include other working stages. That can be made reference to the operating process of driving the light-emitting device to emit light in the pixel circuit in the existing technologies.

In one embodiment shown in FIG. 1, FIG. 2, and FIG. 21, in the driving method of the driving circuit, in the threshold voltage compensation stage t2, the threshold voltage of the driving transistor DT may be compensated by the first voltage signal of the first power supply signal terminal PVDD.

The threshold compensation of the driving transistor DT may be realized by the first voltage signal provided by the first power supply signal terminal PVDD. The gate $DT_G$ of the driving transistor DT may be used as the first node N1, and the source $DT_S$ of the driving transistor DT may be used as the second node N2. During the operation of the driving circuit 00, before the threshold voltage compensation stage t2 is performed, that is, before the demultiplexing circuit 20 performs the data signal charging stage t20, the potential of the first node N1 may be at a fixed potential, and the fixed potential may be a reset voltage signal, the potential of the second node N2 may be the first voltage signal provided by the first power signal terminal PVDD. In the threshold voltage compensation stage t2, the first node N1 may be still at the fixed potential. Since the driving transistor DT is turned on at this time, the drain $DT_D$ of the driving transistor DT may be connected to the second power supply signal terminal PVEE through the light-emitting device EL, such that the first power supply signal terminal PVDD, the driving transistor DT, the light-emitting device EL, and the second power supply signal terminal PVEE may form a current path (at this time, the leakage flow direction G1 of the current is shown in FIG. 2, from the first power supply signal terminal PVDD to the second power supply signal terminal PVEE). Therefore, the potential of the second node N2, that is, the source $DT_S$ of the driving transistor DT, may gradually decrease until the potential difference between the first node N1 and the second node N2 reaches the threshold voltage Vth of the driving transistor DT. Then, the driving transistor DT may be turned off to complete the threshold compensation of the driving transistor DT. Since the threshold value compensation process of the driving transistor DT is realized by the first voltage signal provided by the first power signal terminal PVDD, this process may not require the participation of the data signal. Therefore, while the threshold voltage compensation stage t2 is performed, the data signal charging stage t20 may be also performed. That is, while the threshold voltage compensation stage t2 is performed, the demultiplexing circuit 20 may write the data signal provided by the driver IC (not shown in the figure) into the data lines S such that each data line S has data signal on it.

In the present embodiment, the threshold compensation stage t2 may be realized by the first voltage signal provided by the first power signal terminal PVDD, and may not need the participant of the data signals. Therefore, when the demultiplexing circuit 20 starts to perform the data signal charging stage t20, the threshold compensation stage t2 may be started. When the driving circuit 00 operates, the time of threshold compensation may be increased, to avoid that the time of threshold compensation stage t2 is shortened when both the threshold compensation stage t2 and the data signal charging stage t20 are carried out in sequence. When the time of the threshold compensation stage t2 and the data signal charging stage t20 overlap, the threshold compensation of the driving transistor DT may be more sufficient, and when the driving circuit 00 is applied to a display panel, the uniformity of display brightness and the display effect may be improved. Further, the demultiplexing circuit 20 may adopt the structure of as many clock signal lines as possible, and when the driving circuit 00 is applied to the display panel, it may be beneficial to realize the narrow frame of the display panel while ensuring the display effect.

Another embodiment of the present disclosure shown in FIG. 1 to FIG. 5 and FIG. 22 provides another driving method. In the present embodiment, the driving method may further include other working stages, such as a reset stage t1, a data writing stage t3, and a light-emitting stage t4.

In the reset stage t1, the gate $DT_G$ of the driving transistor DT may be reset. In the data writing stage t3, the data writing module 101 may be configured for writing data signals into the gate $DT_G$ of the driving transistor DT. In the light-emitting stage t4, the drive transistor DT may generate a drive current to drive the light-emitting device EL to emit light.

In one driving cycle, the reset stage t1 may be performed before the threshold voltage compensation stage t2, the data writing stage t3 may be performed after the threshold voltage compensation stage t2, and the light-emitting stage t4 may be performed after the data writing stage t3.

The operation and principle of the driving circuit 00 in the present embodiment can be made reference to the embodiments shown in FIG. 1 to FIG. 5.

Figure 23:
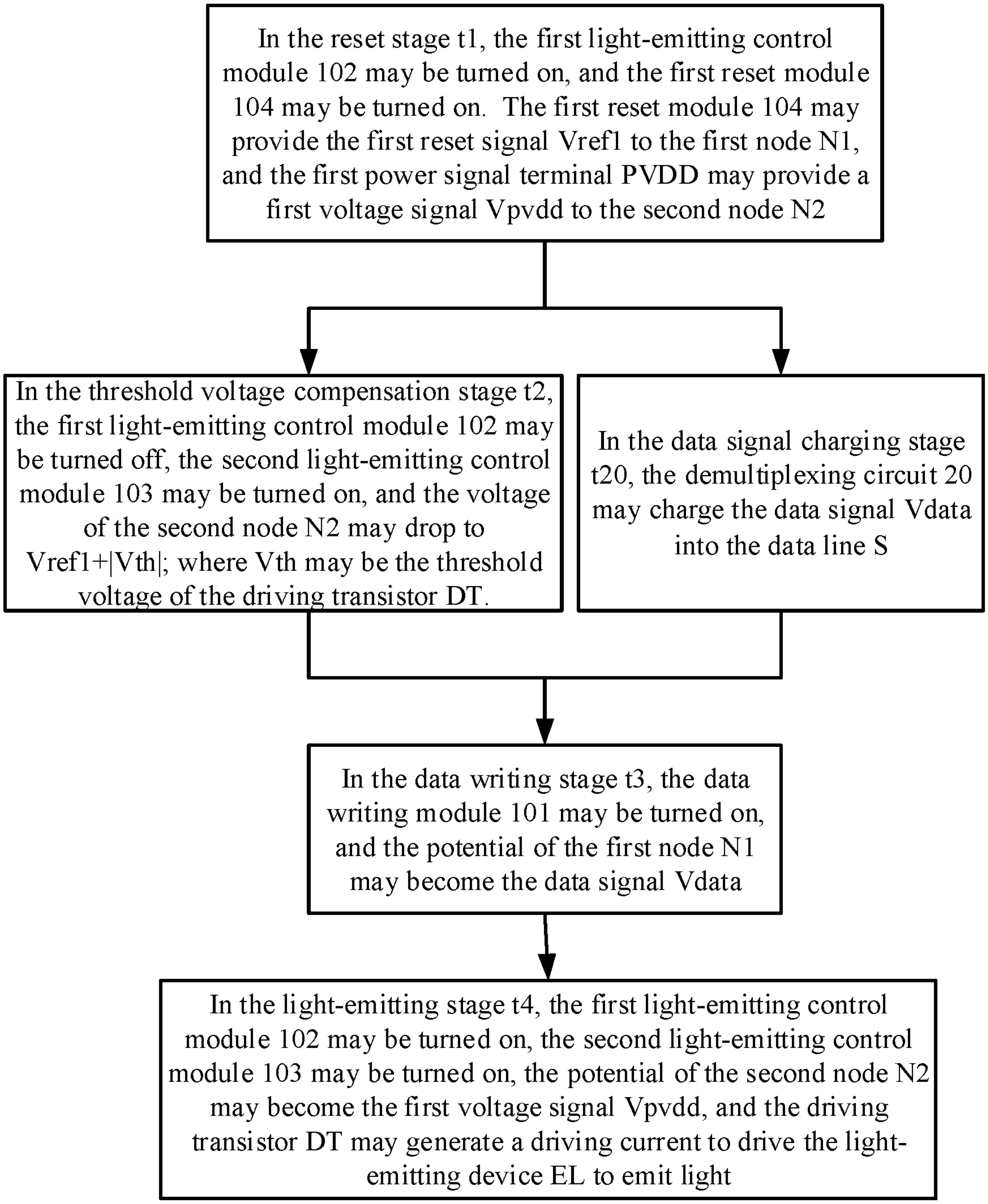
FIG. 23 illustrates another exemplary driving method consistent with various disclosed embodiments in the present disclosure.

Another embodiment of the present disclosure shown in FIG. 3 and FIG. 5 and FIG. 23 provides another driving method. In the present embodiment, the pixel circuit 10 in the driving circuit 00 may further include a first light-emitting control module 102, a second light-emitting control module 103, and a first reset module 104.

The first light-emitting control module 102 may be connected between the source $DT_S$ of the driving transistor DT and the first power signal terminal PVDD.

The second light-emitting control module 103 may be connected between the drain $DT_D$ of the driving transistor DT and the anode of the light-emitting device EL.

An input terminal of the first reset module 104 may be connected to the first reset signal terminal REF1. The first reset signal terminal REF1 may receive the first reset signal Vref1. An output terminal of the first reset module 104 may be connected to the gate $DT_G$ of the driving transistor DT. The signal terminal REF1 may be configured to reset the gate $DT_G$ of the driving transistor DT;

The gate $DT_G$ of the driving transistor DT may be the first node N1, and the source $DT_S$ of the driving transistor DT may be the second node N2. The driving process of the driving circuit 00 may include following stages.

In the reset stage t1, the first light-emitting control module 102 may be turned on, and the first reset module 104 may be turned on. The first reset module 104 may provide the first reset signal Vref1 to the first node N1, and the first power signal terminal PVDD may provide a first voltage signal Vpvdd to the second node N2.

In the threshold voltage compensation stage t2, the first light-emitting control module 102 may be turned off, the second light-emitting control module 103 may be turned on, and the voltage of the second node N2 may drop to Vref1+|Vth|; where Vth may be the threshold voltage of the driving transistor DT. At the same time, in the data signal charging stage t20, the demultiplexing circuit 20 may write the data signal Vdata into the data line S.

In the data writing stage t3, the data writing module 101 may be turned on, and the potential of the first node N1 may become the data signal Vdata.

In the light-emitting stage t4, the first light-emitting control module 102 may be turned on, the second light-emitting control module 103 may be turned on, the potential of the second node N2 may become the first voltage signal Vpvdd, and the driving transistor DT may generate a driving current to drive the light-emitting device EL to emit light.

The operation and principle of the driving circuit 00 in the present embodiment can be made reference to the embodiments shown in FIG. 1 to FIG. 5.

Figure 24:
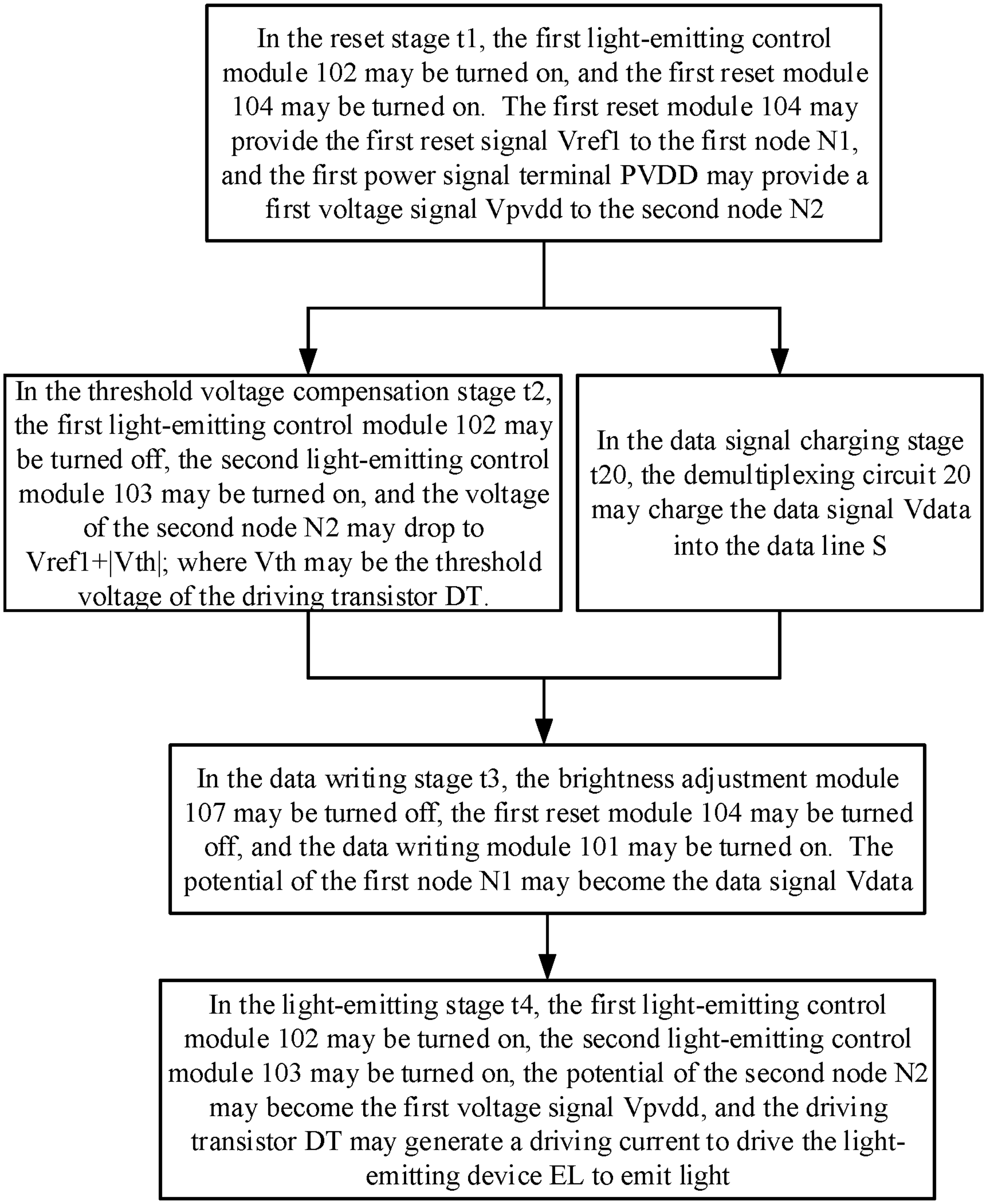
FIG. 24 illustrates another exemplary driving method consistent with various disclosed embodiments in the present disclosure.
Figure 25:
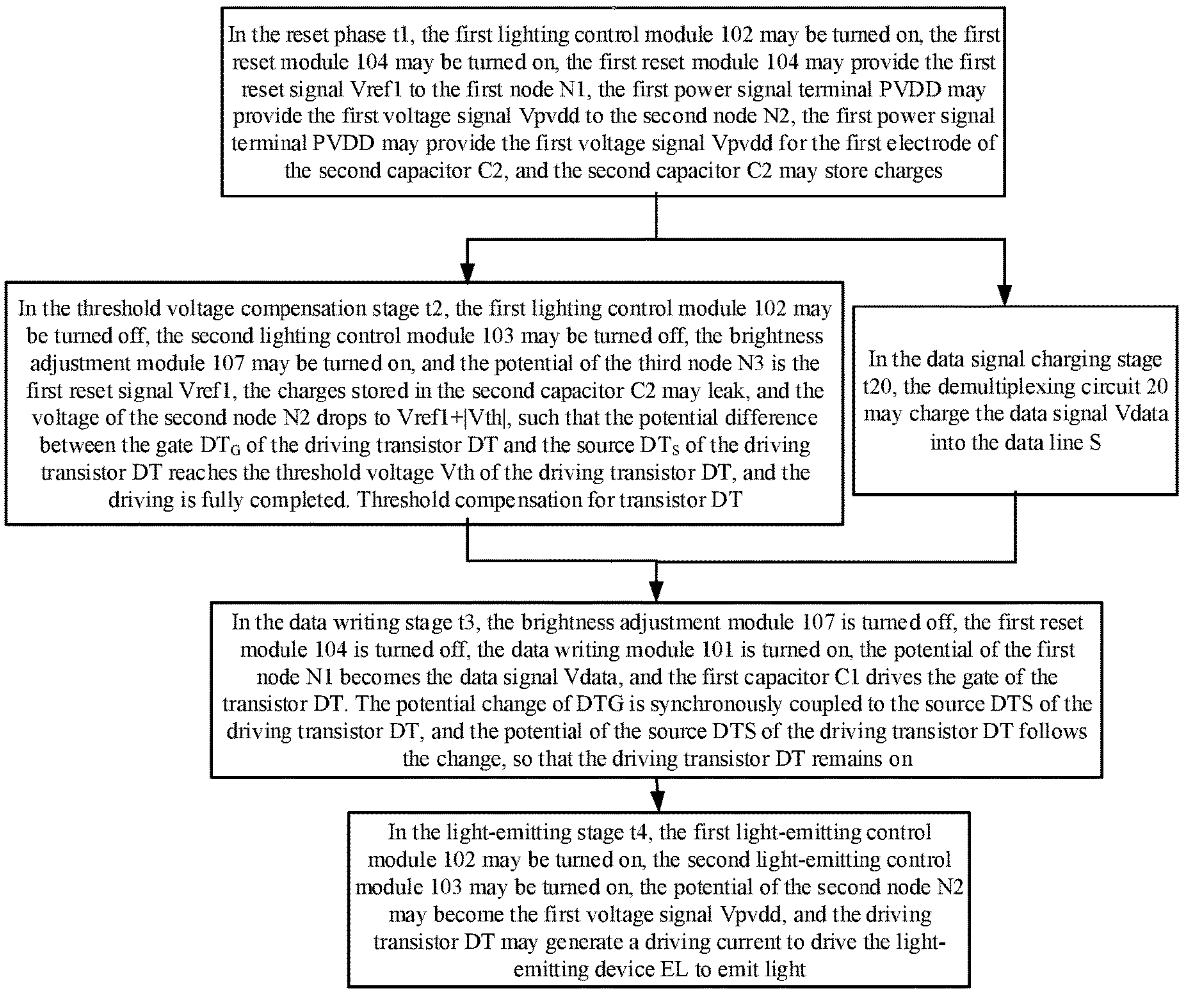
FIG. 25 illustrates another exemplary driving method consistent with various disclosed embodiments in the present disclosure.

Another embodiment of the present disclosure shown in FIG. 8, FIG. 10 and FIG. 24 provides another driving method. In the present embodiment, the pixel circuit 10 in the driving circuit 00 may further include a brightness adjustment module 107.

The brightness adjustment module 107 may be connected between the first reset module 104 and the drain $DT_D$ of the driving transistor DT. The brightness adjustment module 107 may provide the first reset signal Vref1 to the drain $DT_D$ of the driving transistor DT, and may be further configured to connect the first power signal terminal PVDD to the first reset module 104 when performing threshold compensation on the driving transistor DT.

The gate $DT_G$ of the driving transistor DT may be the first node N1, the source $DT_S$ of the driving transistor DT may be the second node N2, and the drain $DT_D$ of the driving transistor DT may be the third node N3.

The driving process of the driving circuit 00 may include following stages.

In the reset stage t1, the first light-emitting control module 102 may be turned on, and the first reset module 104 may be turned on. The first reset module 104 may provide the first reset signal Vref1 to the first node N1, and the first power signal terminal PVDD may provide a first voltage signal Vpvdd to the second node N2.

In the threshold voltage compensation stage t2, the first light-emitting control module 102 may be turned off, the second light-emitting control module 103 may be turned on, and the voltage of the second node N2 may drop to Vref1+|Vth|; where Vth may be the threshold voltage of the driving transistor DT. At the same time, in the data signal charging stage t20, the demultiplexing circuit 20 may write the data signal Vdata into the data line S.

In the data writing stage t3, the brightness adjustment module 107 may be turned off, the first reset module 104 may be turned off, and the data writing module 101 may be turned on. The potential of the first node N1 may become the data signal Vdata.

In the light-emitting stage t4, the first light-emitting control module 102 may be turned on, the second light-emitting control module 103 may be turned on, the potential of the second node N2 may become the first voltage signal Vpvdd, and the driving transistor DT may generate a driving current to drive the light-emitting device EL to emit light.

The operation and principle of the driving circuit 00 in the present embodiment can be made reference to the embodiments shown in FIG. 1 to FIG. 5.

Another embodiment of the present disclosure shown in FIG. 6, FIG. 7, FIG. 8, FIG. 10 and FIG. 25 provides another driving method. In the present embodiment, the pixel circuit 10 in the driving circuit 00 may further a coupling module 105 and a storage module 106. The coupling module 105 may include a first capacitor C1. A first electrode of the first capacitor C1 may be connected to the gate $DT_G$ of the driving transistor DT, and a second electrode of the first capacitor C1 may be connected to the source $DT_S$ of the driving transistor DT. The storage module 106 may include a second capacitor C2. A first electrode of the second capacitor C2 may be connected to the first power signal terminal PVDD, and a second electrode of the second capacitor C2 may be connected to the source $DT_S$ of the driving transistor DT.

In the reset stage t1, the first power supply signal terminal PVDD may provide the first voltage signal Vpvdd for the first electrode of the second capacitor C2, and the second capacitor C2 may store charges; in the threshold voltage compensation stage t2, the charges stored in the second capacitor C2 may leakage current, such that the potential difference between the gate $DT_G$ of the driving transistor DT and the source $DT_S$ of the driving transistor DT reaches the threshold voltage Vth of the driving transistor DT and the threshold compensation of the driving transistor DT is fully completed.

In the data writing stage t3, after the potential of the first node N1 becomes the data signal Vdata, the first capacitor C1 may synchronously couple the potential change of the gate $DT_G$ of the driving transistor DT to the source $DT_S$ of the driving transistor DT, and the potential of the source $DT_S$ of the driving transistor DT may changes accordingly, such that the driving transistor DT is kept on and the light-emitting device EL is driven to emit light.

The operation and principle of the driving circuit 00 in the present embodiment can be made reference to the embodiments shown in FIG. 6 to FIG. 13 and FIG. 5.

Figure 26:
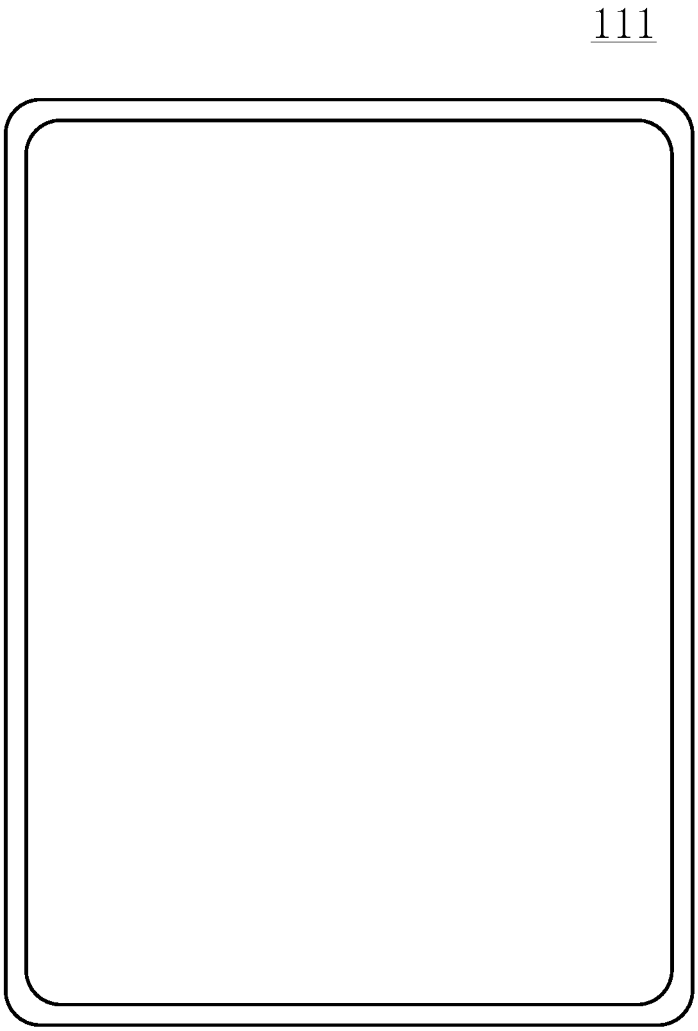
FIG. 26 illustrates a planar structure of an exemplary display panel consistent with various disclosed embodiments in the present disclosure.

The present disclosure also provides a display panel. In one embodiment shown in FIG. 26 which is a planar structure of the display device, the display panel 111 may include a driving circuit provided by various embodiments of the present disclosure. The pixel circuit 10 may be located within each sub-pixel range of the display area of the display panel 111, and the demultiplexing circuit 20 may be located within the range of the non-display area of the display panel 111. In the embodiment in FIG. 26, a mobile phone is used as an example only to describe the display panel 111 provided by the present disclosure. It can be understood that the display panel 111 may be a computer, a TV, a vehicle-mounted display panel, and other display panels with display functions, in various embodiment of the present disclosure. The present disclosure has no limit on this. When the demultiplexing circuit 20 writes the data signal to the data line S, the driving transistor DT of the pixel circuit 10 may perform the threshold compensation. The time for threshold compensation may be increased, such that the driving transistor DT may be sufficiently compensated. Therefore, when the driving circuit 00 is applied to a display panel, the phenomenon of uneven display may be avoided, to improve the uniformity of display brightness and the display effect. Further, since the threshold compensation of the driving transistor DT and the writing of the data signal to the data line by the demultiplexing circuit 20 do not need to be performed in sequence, the demultiplexing circuit 20 may adopt a structure with as many clock signal lines as possible. When the driving circuit 00 of this embodiment is applied to the display panel, it may be beneficial to realize a narrow frame of the display panel while ensuring the display effect.

In the present disclosure, when the demultiplexing circuit 20 writes the data signal to the data line S, the driving transistor DT of the pixel circuit 10 may perform the threshold compensation. The time for threshold compensation may be increased, such that the driving transistor DT may be sufficiently compensated. Therefore, when the driving circuit 00 is applied to a display panel, the phenomenon of uneven display may be avoided, to improve the uniformity of display brightness and the display effect. Further, since the threshold compensation of the driving transistor DT and the writing of the data signal to the data line by the demultiplexing circuit 20 do not need to be performed in sequence, the demultiplexing circuit 20 may adopt a structure with as many clock signal lines as possible. When the driving circuit 00 of this embodiment is applied to the display panel, it may be beneficial to realize a narrow frame of the display panel while ensuring the display effect.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A driving circuit, comprising a pixel circuit and a demultiplexing circuit, wherein:

the pixel circuit includes at least a driving transistor, a light-emitting device, and a data writing module;

the driving transistor is connected between a first power signal terminal and the light-emitting device in series, to generate a driving current;

the data writing module is connected between the driving transistor and the demultiplexing circuit in series, to provide a data signal to the driving transistor;

an output terminal of the demultiplexing circuit is connected to an input terminal of the data writing module through a data line; and the demultiplexing circuit is configured to write the data signal to the data line at the same time when the driving transistor is performing a threshold compensation.

2. The driving circuit according to claim 1, wherein:

the first power signal terminal receives a first voltage signal; and the first power signal terminal is configured for providing the first voltage signal to the pixel circuit, and for performing the threshold compensation on the driving transistor.

3. The driving circuit according to claim 2, wherein:

the data writing module is connected to a gate of the driving transistor.

4. The driving circuit according to claim 3, wherein:

the first power supply signal terminal is connected to a source of the driving transistor;

a drain of the driving transistor is connected to an anode of the light-emitting device;

a cathode of the light-emitting device is connected to a second power supply signal terminal; and the second power supply signal terminal receives a second voltage signal, and is configured to provide the second voltage signal to the pixel circuit.

5. The driving circuit according to claim 4, wherein:

a value of the first voltage signal is greater than a value of the second voltage signal.

6. The driving circuit according to claim 4, wherein:

the pixel circuit further includes a first light-emitting control module, a second light-emitting control module, and a first reset module;

the first light-emitting control module is connected between the source of the driving transistor and the first power signal terminal;

the second light-emitting control module is connected between the drain of the driving transistor and the anode of the light-emitting device;

an input terminal of the first reset module is connected to a first reset signal terminal;

the first reset signal terminal receives a first reset signal;

an output terminal of the first reset module is connected to the gate of the driving transistor; and the first reset signal terminal is configured to reset the gate of the drive transistor.

7. The driving circuit according to claim 6, wherein:

the first light-emitting control module includes a first transistor and a first light-emitting signal terminal;

the first light-emitting signal terminal receives a first light-emitting signal;

a gate of the first transistor is connected to the first light-emitting signal terminal, a source of the first transistor is connected to the first power supply signal terminal, and a drain of the first transistor is connected to the source of the driving transistor;

the second light-emitting control module includes a second transistor and a second light-emitting signal terminal;

the second light-emitting signal terminal receives a second light-emitting signal;

a gate of the second transistor is connected to the second light-emitting signal terminal, a source of the second transistor is connected to the drain of the driving transistor connected, and a drain of the second transistor is connected to the anode of the light-emitting device;

the first reset module includes a third transistor and a first scan signal terminal;

the first scan signal terminal receives a first scan signal;

a gate of the third transistor is connected to the first scan signal terminal, a source of the third transistor is connected to the first reset signal terminal, and a drain of the third transistor is connected to the gate of the driving transistor;

the data writing module includes a fourth transistor and a second scan signal terminal;

the second scan signal terminal receives a second scan signal;

a gate of the fourth transistor is connected to the second scan signal terminal, a source of the fourth transistor is connected to the data line, and a drain of the fourth transistor is connected to the gate of the driving transistor.

8. The driving circuit according to claim 7, wherein:

the pixel circuit further includes a coupling module and a storage module; and the coupling module is connected between the gate and the source of the driving transistor, and the storage module is connected between the first power signal terminal and the source of the driving transistor.

9. The driving circuit according to claim 8, wherein:

the coupling module includes a first capacitor, wherein a first electrode of the first capacitor is connected to the gate of the driving transistor and a second electrode of the first capacitor is connected to the source of the driving transistor; and the storage module includes a second capacitor, wherein a first electrode of the second capacitor is connected to the first power signal terminal and a second electrode of the second capacitor is connected to the source of the driving transistor.

10. The driving circuit according to claim 7, further including a brightness adjustment module between the first reset module and the drain of the driving transistor, wherein:

the brightness adjustment module is configured to provide the first reset signal to the drain of the driving transistor, and is configured to connect the first power signal terminal to the first reset module.

11. The driving circuit according to claim 10, wherein the brightness adjustment module includes a fifth transistor and a third scan signal terminal;

the third scan signal terminal receives a third scan signal; and a gate of the fifth transistor is connected to the third scan signal terminal, a source of the fifth transistor is connected to the gate of the drive transistor, and a drain of the fifth transistor is connected to the drain of the drive transistor.

12. The driving circuit according to claim 11, wherein:

the driving transistor, the first transistor, and the second transistor are P-type transistors; and the third transistor, the fourth transistor, and the fifth transistor are N-type transistors.

13. The driving circuit according to claim 7, wherein:

the pixel circuit further includes a second reset module;

an input terminal of the second reset module is connected to a second reset signal terminal;

the second reset signal terminal receives a second reset signal;

an output terminal of the second reset module is connected to the anode of the light-emitting device; and the second reset signal terminal is configured to reset the anode of the light-emitting device.

14. The driving circuit according to claim 13, wherein:

a value of the first reset signal is different from a value of the second reset signal.

15. The driving circuit according to claim 13, wherein:

the second reset module includes a sixth transistor;

a gate of the sixth transistor is connected to the first light-emitting signal terminal;

a source of the sixth transistor is connected to the second reset signal terminal; and a drain of the sixth transistor is connected to the anode of the light-emitting device.

16. The driving circuit according to claim 1, wherein:

the demultiplexing circuit includes a plurality of demultiplexing units;

each of the demultiplexing units includes a plurality of control terminals, an input terminal, and a plurality of output terminals;

the plurality of control terminals is connected to clock signal terminals;

the clock signal terminals receive clock control signals;

the input terminal receives a data signal; and the plurality of the output terminals is respectively connected to different data lines.

17. The driving circuit according to claim 16, wherein:

in each of the plurality of demultiplexing units, a ratio between the number of the input terminal and the number of the plurality of output terminals is 1:N, wherein N≥6.

18. A display panel comprising a driving circuit, wherein:

the driving circuit includes a pixel circuit and a demultiplexing circuit, wherein:

the pixel circuit includes a driving transistor, a light-emitting device, and a data writing module;

the driving transistor is connected between a first power signal terminal and the light-emitting device in series, to generate a driving current;

the data writing module is connected between the driving transistor and the demultiplexing circuit in series, to provide a data signal to the driving transistor;

an output terminal of the demultiplexing circuit is connected to an input terminal of the data writing module through a data line; and the demultiplexing circuit is configured to write the data signal to the data line at the same time when the driving transistor is performing threshold compensation.

* * * * *